United States Patent
Parikh et al.

(10) Patent No.: US 12,034,873 B2
(45) Date of Patent: Jul. 9, 2024

(54) PRIVACY PROTECTED AUTONOMOUS ATTESTATION

(71) Applicant: Intel Corporation, Santa Clara, CA (US)

(72) Inventors: Bhushan Girishkumar Parikh, Chandler, AZ (US); Hari K. Tadepalli, Gilbet, AZ (US); Stephen T. Palermo, Chandler, AZ (US); Thomas Joseph O'Dwyer, Cashel (IE); Abhilasha Bhargav-Spantzel, Santa Clara, CA (US); Ned M. Smith, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 203 days.

(21) Appl. No.: 17/435,500

(22) PCT Filed: Mar. 27, 2020

(86) PCT No.: PCT/US2020/025211
§ 371 (c)(1),
(2) Date: Sep. 1, 2021

(87) PCT Pub. No.: WO2020/205514
PCT Pub. Date: Oct. 8, 2020

(65) Prior Publication Data
US 2022/0141041 A1 May 5, 2022

Related U.S. Application Data

(60) Provisional application No. 62/827,397, filed on Apr. 1, 2019.

(51) Int. Cl.
*H04L 29/06* (2006.01)
*H04L 9/30* (2006.01)
*H04L 9/32* (2006.01)

(52) U.S. Cl.
CPC .......... *H04L 9/3268* (2013.01); *H04L 9/3066* (2013.01); *H04L 9/3218* (2013.01)

(58) Field of Classification Search
CPC ... H04L 9/3268; H04L 9/3066; H04L 9/3218; H04L 9/0833; H04L 9/3255;
(Continued)

(56) References Cited

U.S. PATENT DOCUMENTS

2005/0138363 A1* 6/2005 Fox ................. H04L 9/3263
713/156
2008/0270786 A1* 10/2008 Brickell ............ H04L 9/3255
713/180
(Continued)

FOREIGN PATENT DOCUMENTS

CN 113544672 10/2021
DE 112020001814 T5 12/2021
(Continued)

OTHER PUBLICATIONS

Thomas Hardjono and Ned Smith, "Fluffy: Simplified Key Exchange for Constrained Environments", dated 2017, pp. 1-46, download from the Internet on May 14, 2023 using URL: https://datatracker.ietf.org/doc/draft-hardjono-ace-fluffy/03/ (Year: 2017).*
(Continued)

*Primary Examiner* — Malcolm Cribbs
(74) *Attorney, Agent, or Firm* — Schwegman Lundberg & Woessner, P.A.

(57) ABSTRACT

An apparatus operating as a certificate authority (CA) is described. The apparatus can perform operations including receiving, from a plurality of requesting devices, a request to join a group. The request can include identification information for the group and attestation evidence for the plurality of requesting devices. Responsive to receiving the
(Continued)

request, the apparatus can provide a group certificate for the group to the plurality of requesting devices.

24 Claims, 18 Drawing Sheets

(58) Field of Classification Search
CPC . H04L 2209/84; H04L 9/0894; H04L 9/3263; H04L 9/0643; H04L 9/0825; H04L 63/065; G06F 21/33; G06F 21/6245; G06F 21/44; G06F 21/45; H04W 12/76
See application file for complete search history.

(56) References Cited

U.S. PATENT DOCUMENTS

| | | | |
|---|---|---|---|
| 2009/0129600 A1* | 5/2009 | Brickell | H04L 9/3234 380/282 |
| 2014/0007190 A1* | 1/2014 | Alperovitch | H04L 63/1441 726/3 |
| 2014/0115659 A1* | 4/2014 | Attfield | G06F 21/51 726/1 |
| 2016/0285630 A1* | 9/2016 | Abraham | H04L 9/3242 |
| 2017/0063815 A1 | 3/2017 | Smith et al. | |
| 2017/0118015 A1* | 4/2017 | Kwak | G05B 15/02 |
| 2017/0180122 A1* | 6/2017 | Smith | H04L 9/0822 |
| 2017/0185814 A1 | 6/2017 | Smith et al. | |
| 2017/0255194 A1* | 9/2017 | Poornachandran | H04W 12/065 |
| 2017/0346640 A1 | 11/2017 | Smith et al. | |
| 2020/0119929 A1* | 4/2020 | Edwards | H04L 9/3265 |

FOREIGN PATENT DOCUMENTS

| | | | | |
|---|---|---|---|---|
| EP | 1429224 A1 * | 6/2004 | | G06F 21/10 |
| JP | 2006109455 A * | 4/2006 | | H04L 63/083 |
| JP | 5281074 B2 | 5/2013 | | |
| KR | 20170013305 A | 2/2017 | | |
| WO | WO-2018203186 A1 * | 11/2018 | | H04L 9/085 |
| WO | WO-2020205514 A1 | 10/2020 | | |

OTHER PUBLICATIONS

"International Application Serial No. PCT/US2020/025211, International Search Report dated Jul. 15, 2020", 3 pgs.

"International Application Serial No. PCT/US2020/025211, Written Opinion dated Jul. 15, 2020", 5 pgs.

"International Application Serial No. PCT US2020 025211, International Preliminary Report on Patentability dated Oct. 14, 2021", 7 pgs.

"Advances In Internet Security", Intel Technology Journal (Part 2 of 3), (Jun. 2009), 69 pgs.

"Advances In Internet Security", Intel Technology Journal (Part 3 of 3), (Jun. 2009), 27 pgs.

"Advances In Internet Security", Intel Technology Journal (Part 1 of 3), (Jun. 2009), 74 pgs.

Brickell, Ernie, et al., "Privacy at the Next Level: Intel's Enhanced Privacy Identification (EPID) Technology", Chapter 5 Intel Technology Journal, vol. 3, Issue 2 pp. 96-111, (2009), 25 pgs.

* cited by examiner

PRIVACY PROTECTED AUTONOMOUS ATTESTATION

PRIORITY CLAIM

This application is a U.S. National Stage Application under 35 U.S.C. 371 from International Application No. PCT/US2020/025211, filed Mar. 27, 2020, published as WO 2020/205514, which claims the benefit of priority to U.S. Provisional Patent Application Ser. No. 62/827,397, filed Apr. 1, 2019, all of which are incorporated herein by reference in their entirety.

TECHNICAL FIELD

Embodiments described herein generally relate to edge computing and related distributed computing environments. In particular, embodiments relate to techniques for mobile device authentication processes in edge computing, multi-access edge computing (MEC), and Internet of Things (IoT) device networks.

BACKGROUND

Edge computing, at a general level, refers to the transition of compute and storage resources closer to endpoint devices (e.g., consumer computing devices, user equipment, etc.) in order to optimize total cost of ownership, reduce application latency, improve service capabilities, and improve compliance with security or data privacy requirements. Edge computing may, in some scenarios, provide a cloud-like distributed service which offers orchestration and management for applications among many types of storage and compute resources. As a result, some implementations of edge computing have been referred to as the "edge cloud" or the "fog", as powerful computing resources previously available only in large remote data centers are moved closer to endpoints and made available for use by consumers at "edge" of the network.

Edge computing may be further integrated with use cases and technology developed for the Internet of Things (IoT) and Fog networking, as endpoint devices and gateways attempt to access network resources and applications at locations moved closer to the "edge" of the network. For instance, developing edge computing use cases in mobile network settings have been designed for integration with multi-access edge computing (MEC), also known as "mobile edge computing." MEC approaches are designed to allow application developers and content providers to access computing capabilities and an IT service environment in dynamic mobile network settings at the edge of the network. Limited standards have been developed by the European Telecommunications Standards Institute (ETSI) industry specification group (ISG) in an attempt to define common interfaces for operation of MEC systems, platforms, hosts, services, and applications.

Edge computing, MEC, and related technologies attempt to provide reduced latency, increased responsiveness, and more available computing power than offered in traditional cloud network services and wide area network connections. Despite the rapid activity occurring with the development of standards and architectures involving these technologies, many limitations and technical problems still exist in the design and use of IoT, MEC, and next-generation edge networks.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Some services, such as banking, healthcare, transit, and other services, require individual authentication. The authentication process is owned by the service provider, which ties access rights directly to an account identifier, which is usually then linked directly to additional private account details. Other services, in contrast, do not require individual subscriber identification. Rather, attestation is required only for the particular service. In at least these situations, privacy of the user may be important. Furthermore, regardless of any privacy needs, attestation should be performed in a timely manner to support device density and network latency requirements.

However, the performance of current privacy protection approaches (e.g., Intel's Enhanced Privacy Identification (EPID), IBM's Identity Mixer Technology (IDEMIX), and Microsoft's U-Prove) may not be not sufficient to support anticipated 5G device latency (1-4 milliseconds) and device density (e.g., about one million connected devices per square kilometer) needs.

Figure 1:
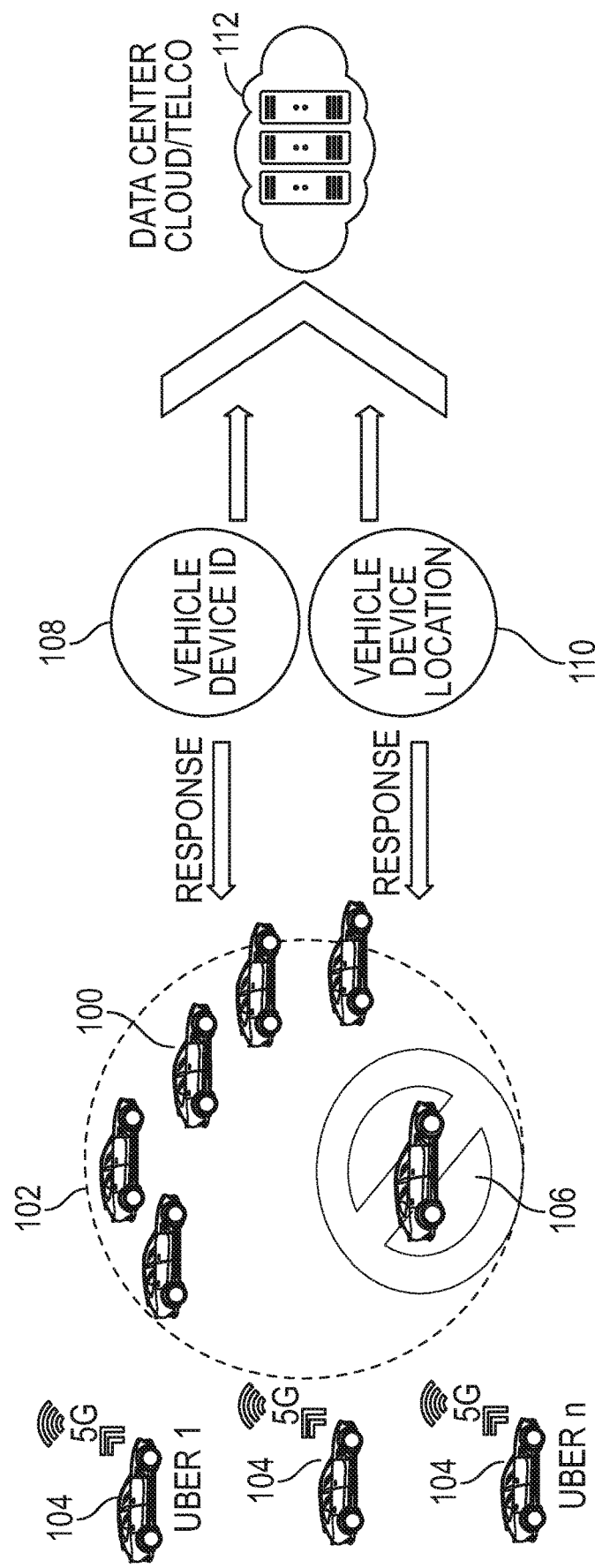
FIG. 1 illustrates a first use case for which any one or more of the techniques (e.g., operations, processes, methods, and methodologies) discussed herein may be performed.

FIG. 1 illustrates a first use case for which any one or more of the techniques (e.g., operations, processes, methods, and methodologies) discussed herein may be performed. In the use case illustrated in FIG. 1, cloud connected mobile devices 100 can perform autonomous attestation. Attestations can include providing some information such as vehicle device identification information 108, or location information 110 for example, to another device 112 that can be included in a server of a remote data center, or an edge server, for example. Attestation can verify location of mobile devices 100, 104, 106. Some devices 100 may be with a fixed zone 102 (e.g., an airport pickup zone), while other devices 104 may be seeking approval to enter the fixed zone 102. Still other devices 106 may be denied access to the fixed zone 102.

The device 112 can include processing circuitry, described later herein, to perform operations including derivation of a public key, join operations, signature generation and signature verification that includes elliptical curve point multiplication. Results of such processing (e.g., keys) can be provided to approved mobile devices 100 for use by mobile devices 100 in accessing services, such as proximity services (e.g., airport pickup services).

Figure 2:
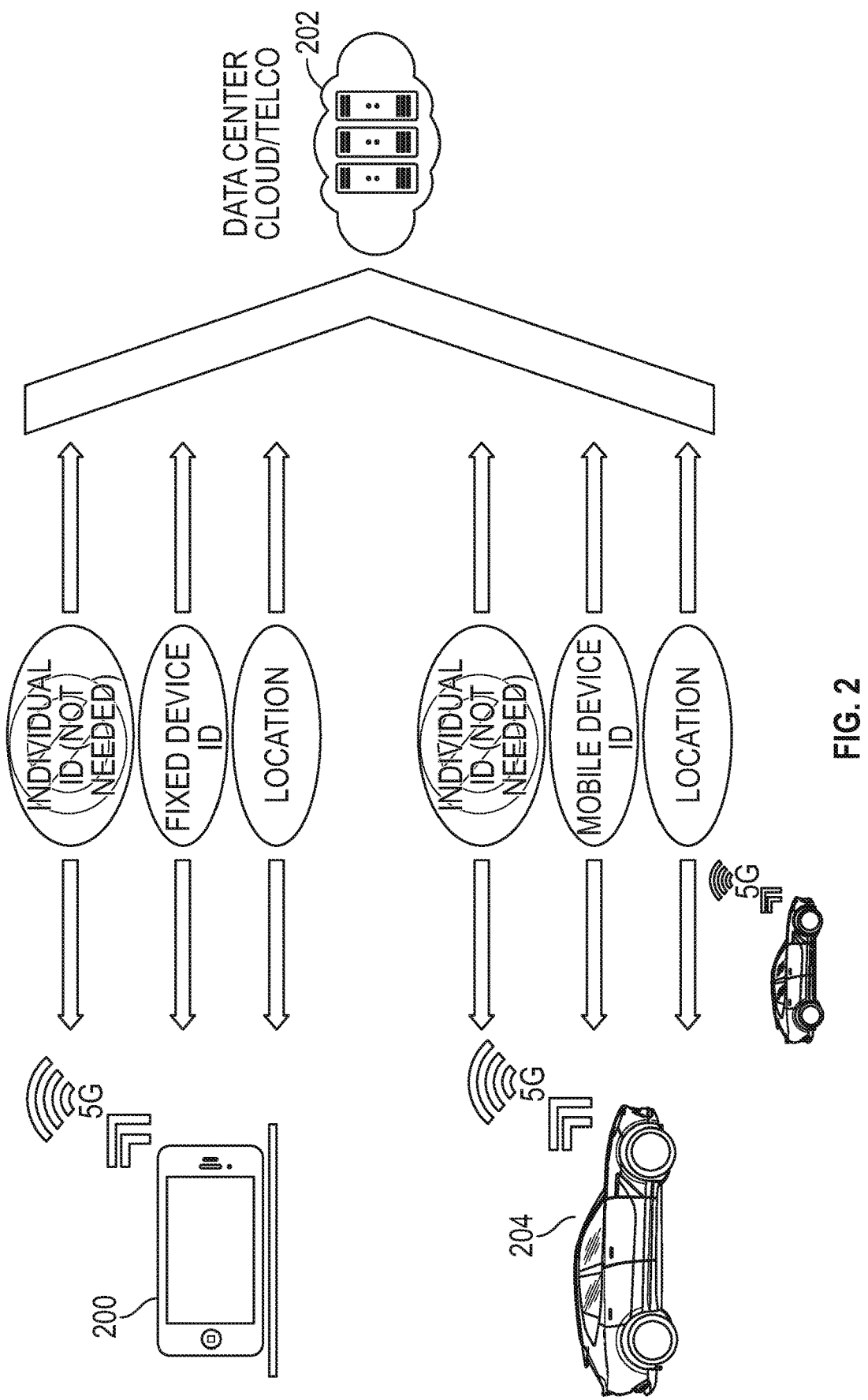
FIG. 2 illustrates a second use case for which any one or more of the techniques (e.g., operations, processes, methods, and methodologies) discussed herein may be performed.

FIG. 2 illustrates a second use case for which any one or more of the techniques (e.g., operations, processes, methods, and methodologies) discussed herein may be performed. In FIG. 2, a fixed device 200 (e.g., an IoT device, whether in the form of a smart home device, toll booth component, building control, energy meter, etc.) can provide a fixed device identifier, location information, etc. to another device 202 that can be included in a server of a remote data center, an edge computing node in an edge computing location, or another device closer to device 200. However, individual identification information is not needed in order to obtain credentials, similarly to the use case illustrated in FIG. 1. Similarly, mobile device 204 (e.g., autonomous mobile devices, toll passes for use in mobile device 204, smart watches, smart sensors, autonomous vehicles, wearable medical devices, etc.) can receive credentials for accessing services merely by providing mobile device identifiers, or location information. Individual subscriber identification is not needed. Processing circuitry of the device 112 can provide autonomous attestation to fixed devices 200 and mobile devices 204 simultaneously in any combination. For example, under autonomous attestation in accordance with various embodiments, mobile device 204 can pass through a toll booth without providing personal information beyond a previously-issued RFID tag. The individual subscriber identification information is not directly known in any transaction or tracking device 112.

These use cases illustrate the need for high performing, privacy protecting, roaming and stationary attestation mechanisms. In some cases, edge ecosystem players are trusted to protect endpoint privacy, but in some cases the device (e.g., mobile and fixed devices illustrated in FIG. 1 and FIG. 2) must have attestation capability to select between privacy preserving and traditional attestation credentials. In addition, the credential used must be dynamically derived as some edge devices do not have sufficient storage to maintain multiple keys.

Previous attestation solutions include solutions include: Trusted Computing group (TCG) Trusted Platform Module (TPM), TCG Device identifier Composition Engine (DICE) Layered Attestation, Intel Software Guard Extensions (SGX), Intel Trusted Execution Technology (TXT) (variant of TPM), Fast IDentity Online (FIDO) Alliance, Global Platform, and Google KeyStore Attestation. Various telemetry collection technologies are also available. However, these various technologies do not support all features of EPID and therefore do not take advantage of all security and efficiency improvements in EPID. For example, TPM and TXT do not implement EPID groups or EPID revocation. TCG DICE Layered Attestation does not implement EPID groups or privacy preserving attestation. Intel SGX supports EPID but does not support Privacy CA and layered attestation. FIDO Alliance and Global Platform do not support device provenance, privacy and layered attestation. FIDO Alliance and Global Platform also do not implement location context claim. Google Key Store does not implement privacy protected attestation, and does not implement location context claim. Finally, none of the above-listed technologies implement EPID performance optimization of revocation.

Embodiments address speed and efficiency concerns by using bilinear maps over elliptic curve groups for increased speed of cryptographic anonymous attestation operations of a certificate authority (CA). The CA can be different from a traditional CA in a PKI setting; instead, the CA can be any number of devices used in edge computing and IoT scenarios. Such operations can include: derivation of the public key, join operations, signature generation, and signature verification, all of which can involve several elliptic curve point multiplication operations.

Embodiments also address concerns that may arise when a device includes multiple sub-environments that may interact with different edge services (e.g., management services, user authentication services, Function as a Service (FaaS) cluster managers, edge service level agreement (SLA) orchestrators, users, load balancers, etc.). Use of a DICE hardware root-of-trust allows each IP block, peripheral, field-programmable gate array (FPGA), trusted execution environment (TEE) or other sub-environment in a platform to have native capability to generate attestable identities including privacy preserving identities. Embodiments enable cloud and communication service providers to support 5G device latency and device capacity providing simultaneous (individual privacy protected) attestations for both fixed and mobile devices.

Methods according to embodiments allow devices to remain fully anonymous or partially anonymous where group memberships can be semi-permissioned. Device configuration determines group membership allowing automatic group definitions and populous groups without impacting application or user-defined grouping semantics. Devices can implicitly attest with privacy preserving properties as part of existing/normal secured interactions involving asymmetric credentials. Furthermore, methods according to embodiments allow devices to attest with privacy while in any operational mode; (reset, normal, quarantine, recovery etc.).

Embodiments use group credentials and DICE layering to enable privacy preserving attestation of operational facets of a device. In Edge use cases which many devices operate with the same software and configuration, devices can use this multiplicity to protect privacy. Verifiers may simply require knowledge of the device's configuration but not which instance of the device it is. The DICE layering architecture allows each layer to form a group (with multiple other devices having the same layer-specific configuration) as described in more detail below.

An EPID key and group may be defined for each DICE layer. EPID groups can be formed in one of a number of ways. As a first example, a DICE TCB component identifier (TCI) can be used as an EPID gid (group ID). In this option, the TCI refers to a known configuration and the device uses traditional attestation to prove compliance. The group issuer is trusted in that the group issuer may use traditional attestation to enforce non-anonymous group membership, but non-group verifiers cannot distinguish between group members.

As a second example method of forming an EPID group, the DICE CDI is used with zero-knowledge proof (ZKP) commitment (i.e., EPID join protocol) to generate a group attestation key. In this option the group join protocol is modified to perform attribute attestation of the Evidence defining the group. The EPID certificate contains an Evidence extension that informs all would-be verifiers of the attributes used to configure the layer. The issuer and members maintain anonymity even during group join/registration phase. Non-group verifiers cannot distinguish between group members.

Figure 3:
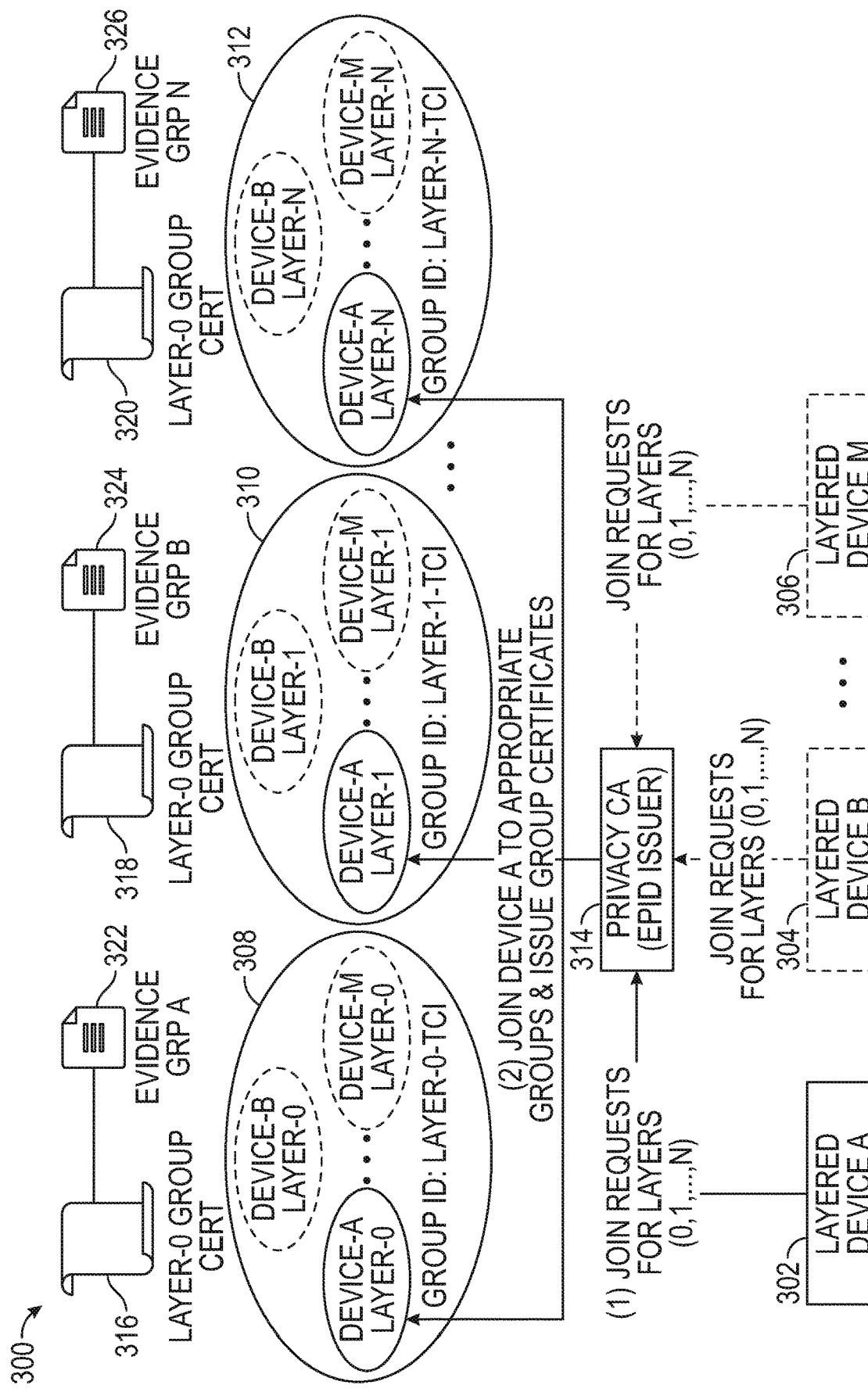
FIG. 3 illustrates an example system in which device attestation can take place according to an example.

FIG. 3 illustrates an example system 300 in which device attestation can take place according to an example. In FIG. 3, a community of devices 302, 304 and 306 that may be partitioned into layers or components in which different layers may implement different functionality and where each layer may derive identifiers using a DICE root of trust, Compound Device Identifier (CDI) and Trusted Computing Base (TCB) Component Identifier (TCI). While three devices 302, 304, 306 are shown, the example system 300 can include any number of mobile or fixed devices.

Figure 4:
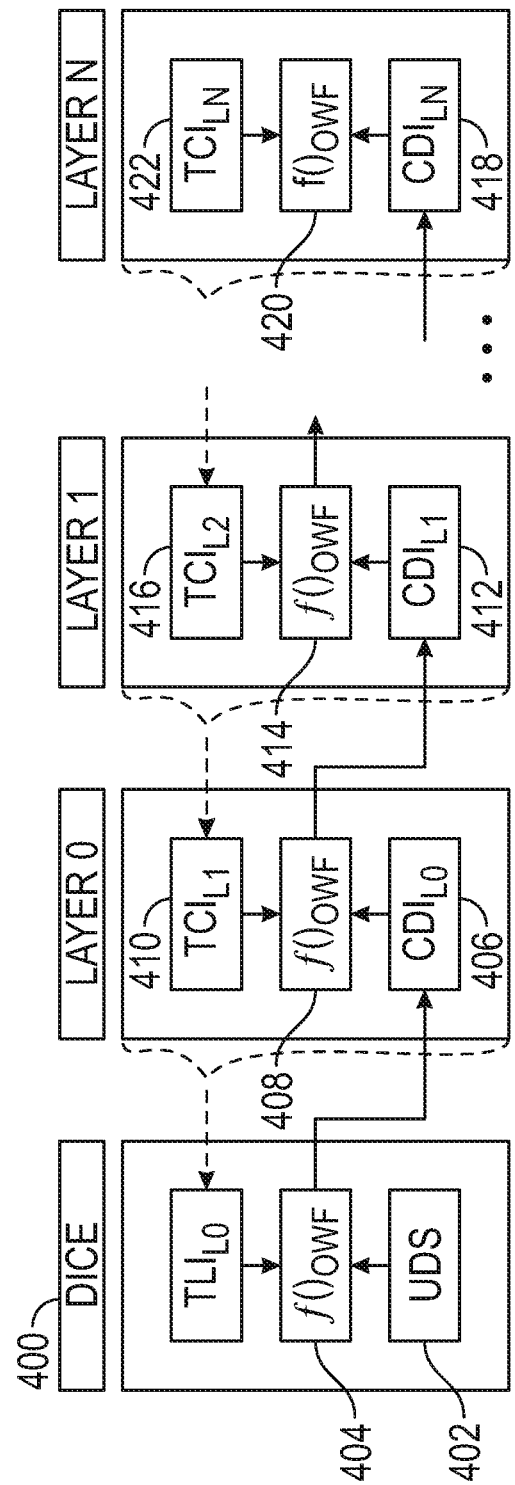
FIG. 4 illustrates device layering according to some examples.

FIG. 4 illustrates device layering according to some examples. The hardware implementing DICE is the first layer 400 of the TCB layered architecture. Subsequent TCB layers can be dynamically added or removed to fall back to a trusted state. TCB layers can be added during manufacturing and/or later during deployment of the corresponding device. Base layer (e.g., layer 400) capabilities are trusted and implemented in hardware, and can be, for example, programmed into hardware using fuses during manufacturing. Algorithms for computing cryptographic one-way functions, key derivation and key generation functions, circuit power-on, and bootstrapping control logic are some examples of such functions that can be implemented in this hardware.

Referring to FIG. 4, DICE layer (e.g., a hardware layer) 400 can include trusted capabilities including Unique Device Secret (LIDS) 402. The UDS is a one-time programmable globally unique value that can be used to seed a CDI function 404 that, when combined with a First Mutable Code (FMC) value, generates a symmetric secret that is specific to the layer that provided the FMC. The FMC combined with Layer 0 product ID information identifies the Layer 0 TCB. The CDI function is a one-way function that uses the UDS to produce a keyed hash of the FMC. This keyed hash is referred to hereinafter as the CDI 406 for Layer 0. The CDI 406 uniquely identifies Layer 0 TCB.

Similarly, the CDI 406 seeds function 408 and uses identification information 410 of Layer 1 to generate CDI 412. CDI 412 seeds function 414 and uses information 416 of Layer 2 to generate a CDI for Layer 2, and so forth for n layers. Therefore, as shown in FIG. 4, each layer (e.g., Layer 0, Layer 1, . . . Layer n) may have layer-specific TCI, CDI and keys.

Figure 5:
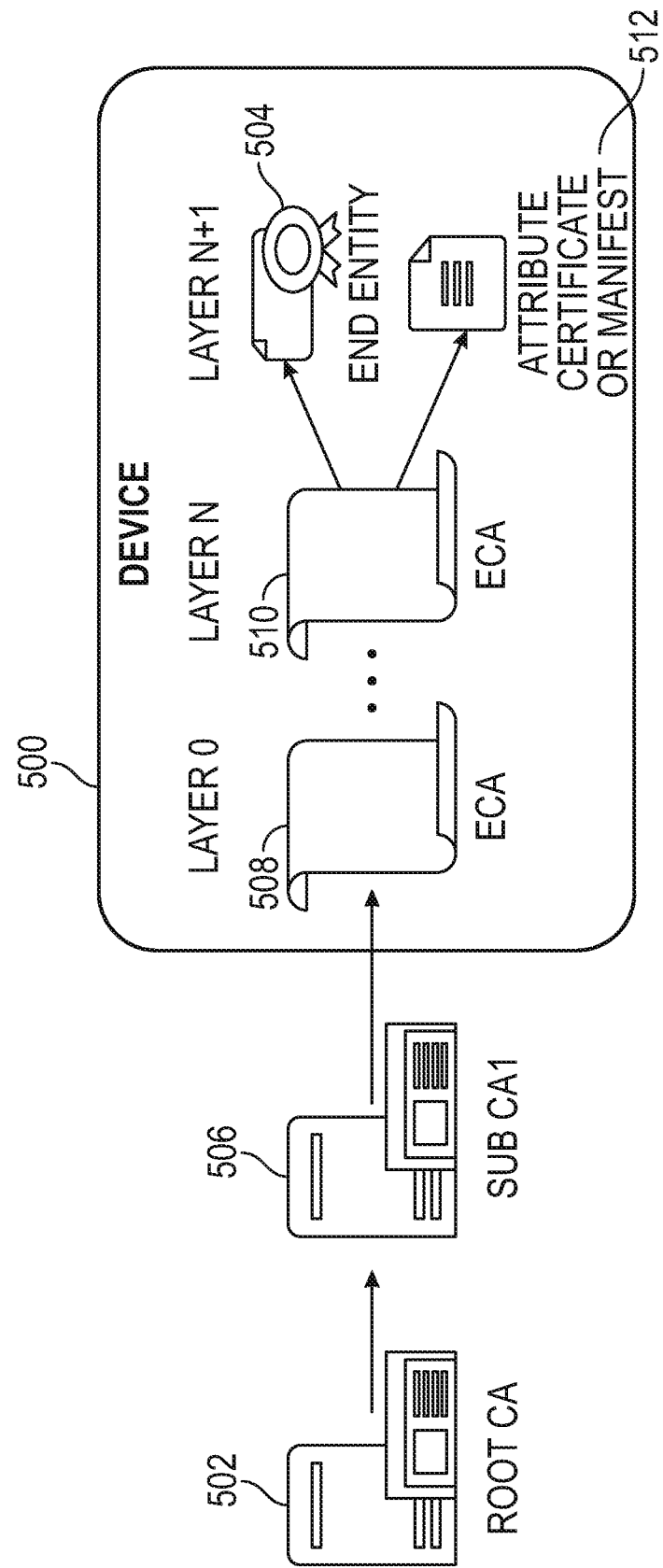
FIG. 5 illustrates use of an attestable layered device in an attestation process according to an example.

Layer-specific keys may be used for attestation. FIG. 5 illustrates use of an attestable layered device 500 in an attestation process according to an example. A certification hierarchy can include a number of tiers between the root certificate authority (CA) 502 and end entity certificate 504. One or more Subordinate CAs 506 can exist between the root CA 502 and end entity certificate 504 to define and authorize the types of certificates that can be requested from the root CA 502. End entity certificate 504 is installed on the device 500 for performance of various operations (e.g., email encryption, digital signing, authentication, etc.). One or more of the layers (described above with respect to FIG. 4) can implement embedded CAs (ECAs) 508, 510 as will be described in more detail below. Optional attribute certificates 512 can also be generated.

Referring again to FIG. 3, it is expected that many devices (e.g., devices 302, 304, 306) will be deployed or operate in edge deployments and that the devices 302, 304, 306 will run firmware and software that is common across a large number of devices. In other words, the layer-0 for device 302 may include the same firmware or software as layer-0 for device 304, etc. This results in groups 308, 310, 312 formed based on layer implementation that have many members (e.g., group 308 may include layer-0 for device 302, layer-0 for device 304, layer-0 for device 306, etc.). The group 308 for layer-0 firmware can be given an identifier based on the hash of the firmware (e.g. $TCI_{L0}$ (FIG. 4)). There may be in devices in an edge network with the same layer 0 TCI hence, there is a lint possibility that a verifier can track or correlate transactions involving device 302 given that device 302 attests using a group-based credential (e.g., EPID).

Device 302 can request a group 308 credential by creating an EPID key for each DICE layer that device 302 anticipates that device 302 will need to perform privacy preserving attestations. Device 302 will transmit an EPID Join request (to be further described later herein with reference to FIG. 8) to a Privacy CA 314 that is also an EPID Issuer. The Privacy CA 314 can detect, based on the request by device 302 that a layer-0 TCI exists where the group ID is expressed using the TCI. Therefore, the Privacy CA 314 can form an EPID group (e.g., group 308) for a layer-0 TCI (e.g. $gid_{L0}=TCI_{L0}$). The same observation is made for other layers of device 302 (e.g. $gid_{L1}=TCI_{L1}, \ldots, gid_{Ln}=TCI_{Ln}$).

The Privacy CA 314 can issue group credentials (e.g., certificates) for each group (e.g. certificate 316, 318 or 320). The group certificate 316, 318, 320 contains attestation evidence 322, 324 or 326 that describes the trustworthiness properties of the layer-x environment. When a layer-x TCB (wherein layer-x refers to one of Layer 0, Layer 1 etc. as described above with reference to FIG. 4) wishes to attest layer-x trustworthiness properties anonymously, layer-x uses the layer-x EPID group certificate 316, 318 or 320. The verifier can appraise the evidence following a policy that determines whether the layer-x firmware is trustworthy. Because there are 1/m possible devices with layer-x firmware, there is a 1/m chance the verifier could guess correctly the device. The group-attestation key is unique per device 302, 304, 306 but cannot be used (by the verifier or other party) to detect which exact device is making the request.

Figure 6:
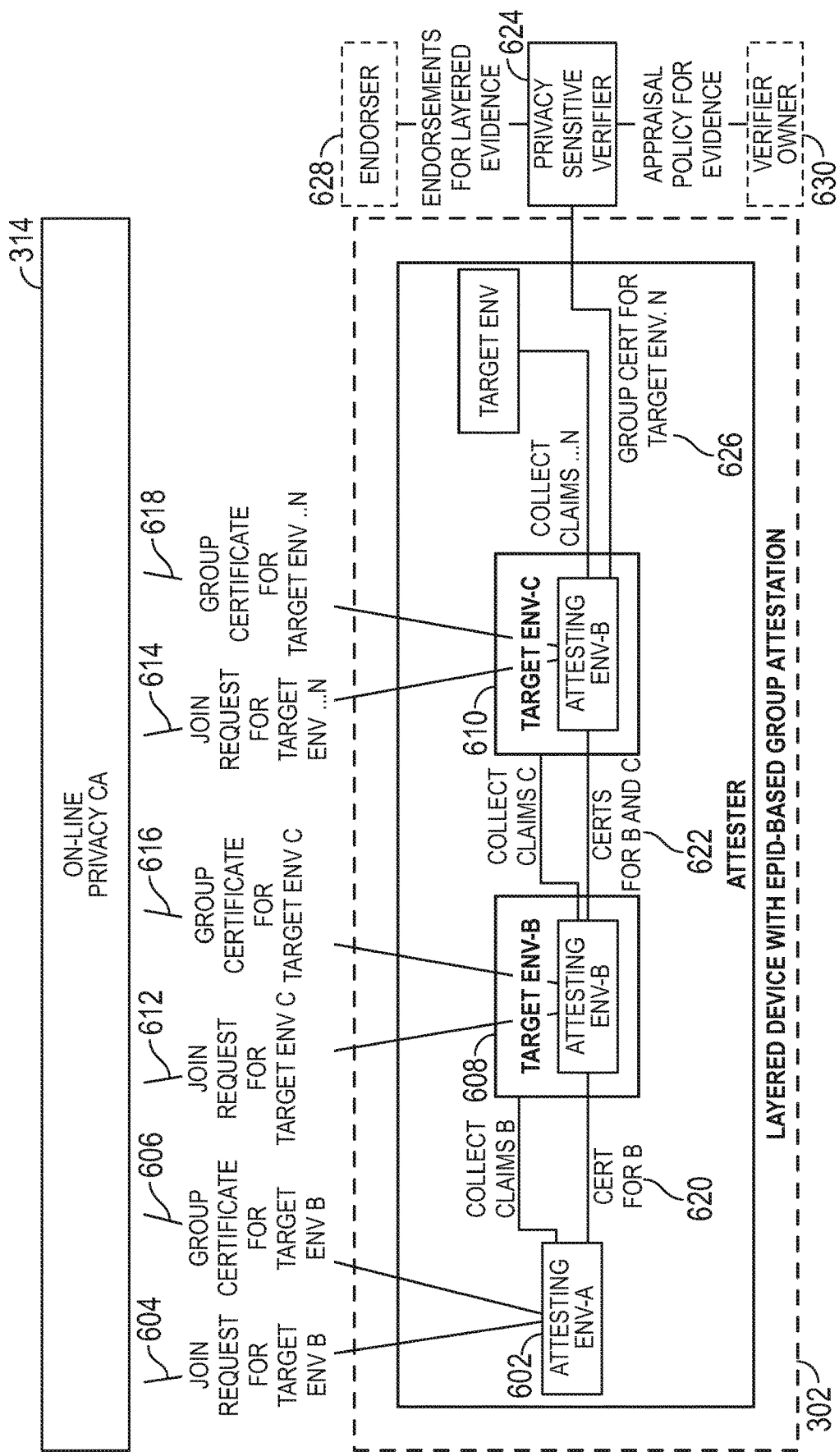
FIG. 6 illustrates privacy-preserving attestation, according to an example.

FIG. 6 illustrates privacy-preserving attestation according to an example. In some examples, the illustrated attestation requests may be made by one or more of layered devices 302, 304, 306 (FIG. 3) to a privacy CA 314 (FIG. 3). In some examples, requests may be made to an online CA, while in other examples, at least some of the functionalities of an online CA can be performed offline, or by other layered devices 302, 304, 306 or by edge network components, for example. In some examples, privacy preserving attestation can take place simultaneously with non-privacy preserving attestation when group identification is received for some operations but individual identification is received for other operations.

Attestation can include an attesting environment 602 of a device 302 submitting a join request 604 and receiving a response 606 to the request from privacy CA 314. As described earlier herein, different environments of the device 302 perform device interaction with different Edge services. For example, attesting environment 602 may be for performing Edge management services. The response 606 can include a group certificate to be used in accessing services. Other environments 608, 610 can submit similar requests 612, 614 and receive similar group certificates in responses 616, 618. Environments can provide received certificates to other environments of the device 302 at operations 620 and 622. The device 302 can provide group certificates to a privacy-sensitive verifier 624 at operation 626. The verifier 624 can assess the certificates using endorsements of an endorser 628 and appraises policies for evidence based on input from an owner 630. The protocol for join requests and responses is described in more detail below with respect to FIG. 8.

Figure 7:
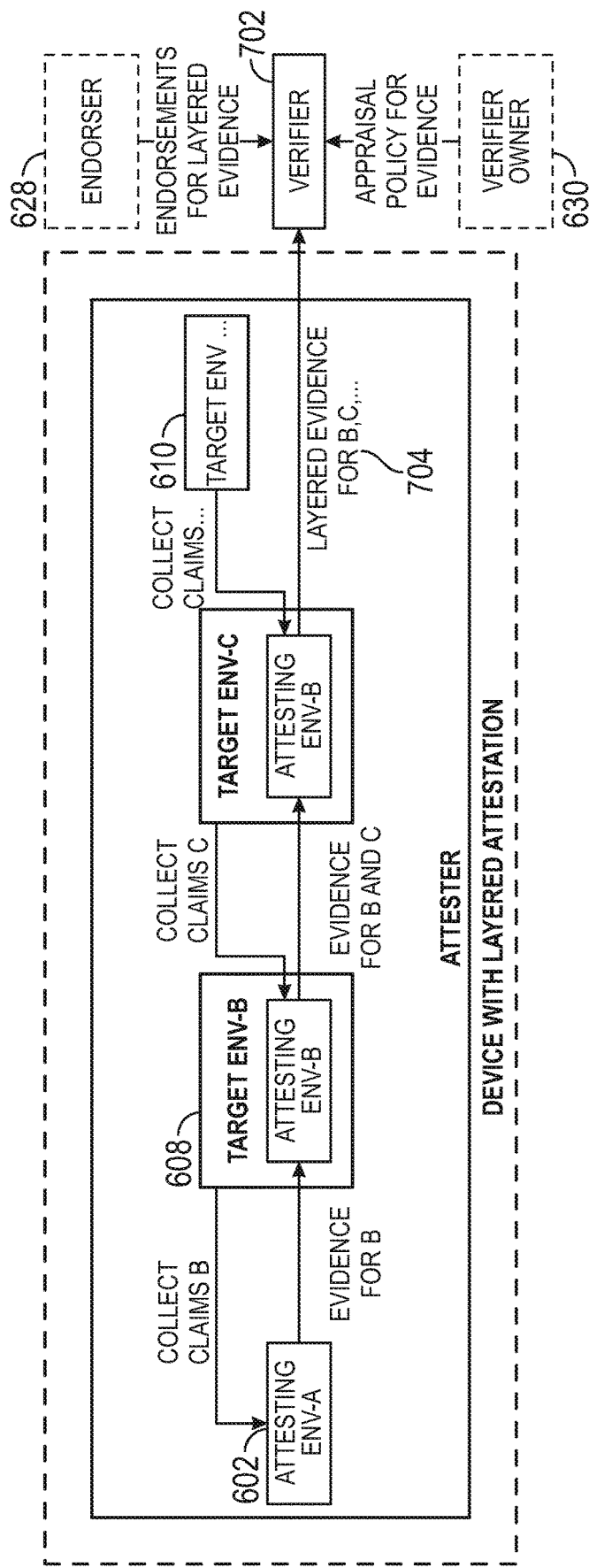
FIG. 7 illustrates non-privacy preserving attestation, according to an example.

FIG. 7 illustrates layered attestation that is not privacy-preserving according to an example. The non-privacy preserving credentials are issued by an Embedded CA (ECA) function using a DICE CDI seed or a random seed to generate the layer-specific attestation key, rather than receiving group certificates as in privacy-preserving attestation. Use of this key enables a non-privacy preserving verifier 702 to build a database of transactions linking the device layer. Evidence 704 is provided that can be used to verify user identity, thus the transaction is non-privacy preserving. Corroborating verifiers can merge their respective databases to create a much larger privacy revealing data set.

Figure 8:
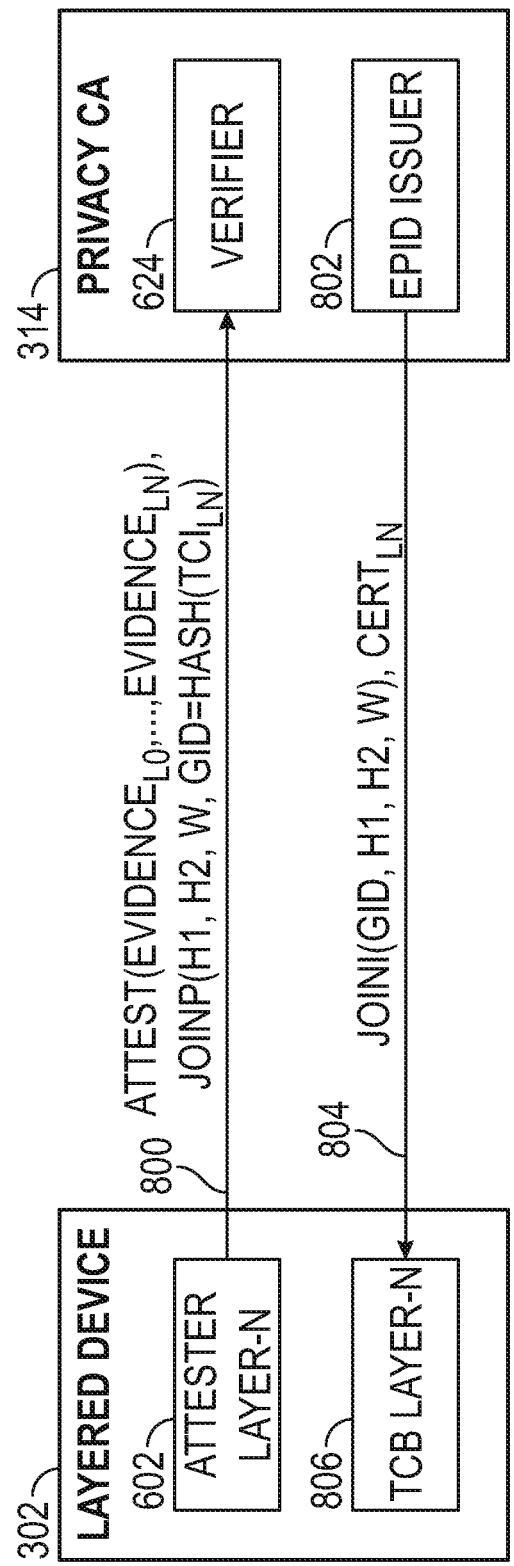
FIG. 8 illustrates a protocol for implementing messaging in support of an example.

FIG. 8 illustrates a protocol for implementing messaging in support of some examples. Elements that are similar those in FIGS. 1-7 are described using similar reference numerals.

The protocol according to FIG. 8 combines group join protocol with attestation protocol such that a condition of entering the EPID group is that the layer-N attestation can be verified by the verifier 624. A traditional non-privacy preserving attestation credential may be used to prove the trustworthiness of the layer and all of its sub-layers ensuring the device is not compromised. The privacy CA 314 is trusted not to correlate the non-privacy preserving keys with the privacy preserving EPID key. The privacy CA 314 uses the JoinP parameters of message 800 to generate the group public key and to generate private key generation parameters used by the device 302 and the EPID issuer 802 transmits a unique group private key via the JoinI message 804 to layer 806.

The privacy CA 314 uses the hash of the TCI to determine the group name and uses the evidence from the attestation to select which attestation evidence is appropriate for inclusion in the group certificate. Selection of evidence may involve evaluating the number of devices already members of a group. If there exists no suitable group of at least size t, then the JoinI response 804 may be delayed until t+1 JoinP requests are pending. The threshold t is selected to be statistically safe. For example, if t=1 million then verifiers would have 1/1 M chance at correctly correlating transactions involving the EPID private key.

Implicit Attestation Using END Groups

In another embodiment, methods make use of distributed zero knowledge proofs (ZKPs) to have a privacy preserving verification of evidence and implicit attestation. The policy for the group includes a configuration, and the verifier uses the group key to ensure that the configuration of the device complies with the acceptable policy. The verifier uses a group certificate to verifier a member of a group and the verifier can use that to identify the point of compliance. When a device authenticates to this certificate then the device can also assert the policy. GID is part of this policy configuration. Overall this method not only minimized the information that is revealed by each layer but reduces the complexity of the verifier making the verifier more robust and scalable.

Figure 9:
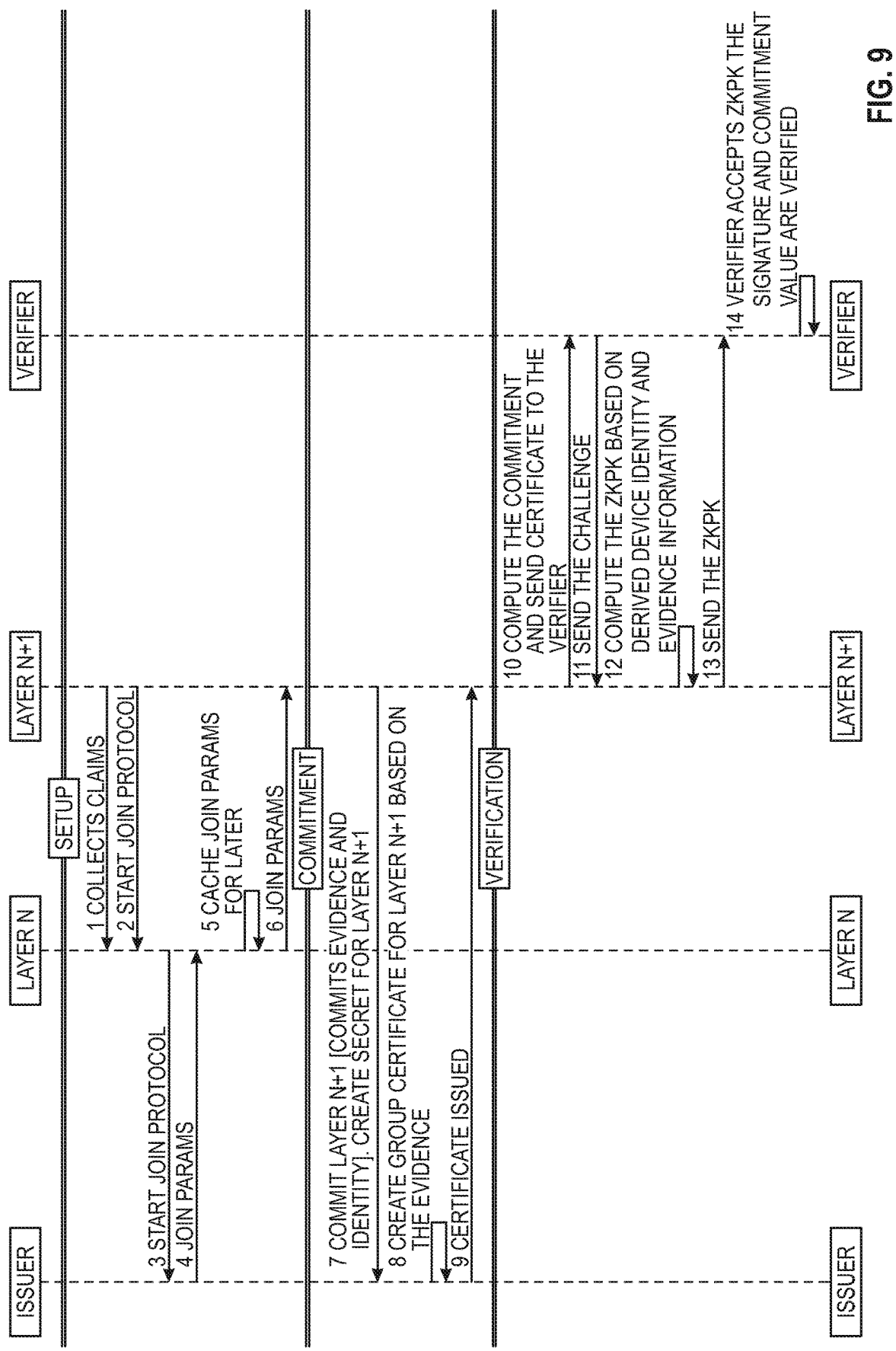
FIG. 9 illustrates implicit attestation using zero-knowledge proofs according to an example.

A ZKP includes at least two operations: (1) commitment of secret data (e.g. derived DICE id, evidence and potentially other policy data) and (2) proof of knowledge of the secret data. Referring to FIG. 9, commitment is done during the Join protocol (messages 1-6) and the proof is created during the Verify group membership protocol (messages 7-9).

Zero knowledge commitments are made as follows. To be able to create proof on an identifier m, the device creates a Pedersen's commitment of the form $$M = g_1^m h_1^r$$

where r is a random value chosen by the user and $g_1$ and $h_1$ are public parameters of the registrar. Optionally at message 1, layer n+1 collects claims from layer n. This commitment is enrolled at the layer n+1 for Layer n to allow Join Group n at messages 2-4. At message 5 layer n caches the Join parameters for later use and at message 6 layer n passes the Join parameters to layer n+1. At commitment, message 7, the layer n+1 creates a secret value using the CDI (or derived from the CDI). The secret is a unique private key that can be used to create group signatures. Let $\sigma_1, \sigma_2, \ldots, \sigma_t$ be the signatures corresponding to the device identifiers and the evidence that need to be proved by the layer n to the layer n+1. At the time of registration the layer n+1 aggregates the signatures into $$\sigma = \prod_{i=1}^{t} \sigma_i,$$

where $\sigma_i$ is the signature of committed value $$M_i = g_1^{m_i} h_1^{r_i}.$$

This is to allow multiple commitments (attestation evidence) from Layer n+1 to the issuer. This gets aggregated and signed by the group certificate in the next steps.

At message 8, the Issuer creates the group certificate (note: subsequent member commits may forego certificate creation since it is already created and is identical for all group members). The certificate may contain an attestation evidence extension so the verifier has access to an explicit representation of the evidence. The group certificate is conveyed to layer n+1 using message 9. The layer n+1 signs the commitment M to output $\sigma = M^\chi$ as the signature where $\chi$ is the secret key (corresponding to the group key) of layer n+1. M commits the attestation evidence and the layer n_1 identity. Subsequent to performing the above operations, the layer n+1 can interact with a verifier to prove group membership, implicitly attest a layer n+1 configuration, and perform anonymous transactions using the group private key.

Verification protocols using the group key typically involve receipt of a challenge message, typically containing a freshness nonce, from the verifier followed by a response from a prover that proves the challenge is either true or false. Failure to respond implies the proof is false. Message 10 supplies a layer n+1 proof of the challenge message and implicitly proves the layer n+1 configuration (as defined by the evidence in the group certificate) is also true.

Verification proceeds as follows. The signatures can include only one signature if only one secret device identifier/evidence or group membership is to be proven. However, the description herein generalizes the algorithm to a set of attributes for cases where the registration requires not only a device identity but other attributes of the device. These attributes are included as part of the zero-knowledge proof to avoid information leakage while satisfying the registration consideration. In some embodiments, two example commitments are included: the first includes proofs of evidence and the second includes the DICE key used for implicit attestation.

In message 10, the layer n+1 computes $$M = \prod_{i=1}^{t} M_i = g_1^{m_1+\cdots+m_t} h_1^{r_1+\cdots+r_t}.$$

The Layer n+1 sends σ, M, $M_i$, 1≤i≤t to the verifier.

In operation 11, the verifier sends the challenge, and the prover (layer n+1) will create the ZKPK. The prover and the verifier carry out the following ZKPK protocol as part of operations 12 and 13:

$$PK\{(\alpha, \beta): M = g_1^\alpha h_1^\beta, \alpha, \beta \in Z_q\}$$

After the verifier accepts the zero-knowledge proof of the commitments, it checks if the following verifications succeed (operation 14):

$$M = \prod_{i=1}^{t} M_i \text{ and } e(\sigma, g_2) = e(M, v)$$

where $g_2$ is a public parameter, v is the public key of the registrar and e is a bilinear mapping. If the last step succeeds, then the verifier accepts the ZKPK of the signed commitments.

At the end of the proof, methods according to example embodiments have obtained the ZKP proving knowledge of the evidence (as opposed to evidence in clear) and also that it knows the value of the derived DICE key leading to the implicit attestation.

Evidence might include location context such as GPS coordinates or BS tower triangulation. Attested location information allows the Privacy CA 314 to apply a geofence policy to the device 302 when being admitted to the group. The combination of a layer-x firmware configuration with a geo-location asserts that a trustworthy implementation of firmware is used to produce the location coordinate.

Subsequent reading of a location coordinate by the same software could be used when performing dynamic attestations of location. Use of the END group key to sign the dynamic attestations will ensure privacy while also ensuring the location coordinates are supplied using trustworthy firmware.

Crypto-Acceleration and Elliptical Curve Cryptography (ECC)

A content processing module (CPM) Public Key Unit is a CPM slice that interfaces to a CPM Shared RAM. PKE circuitry (described in more detail herein with respect to FIG. 11) can accelerate computationally expensive operations in Internet Key Exchange (IKE) and TLS/SSL applications. PKE circuitry can be used to perform modular exponentiation operations on large numbers, though it performs many other functions as well. Modular exponentiation is defined as the integer operation ge mod m, where g is the base, e is the exponent and in is the modulus. In some examples, PIKE circuitry is to work with modular exponentiation operands in the range of 512 to 8192 bits.

Acceleration of modular exponentiation can improve performance of public key algorithms, including: Diffie-Hellman key exchange, DSA digital signature, RSA digital signature, RSA encryption/decryption, or primality testing. PKE circuitry can also perform other arithmetic functions that are auxiliary to public key cryptography, such as the computation of modular inverse and greatest-common-divisor on large numbers. PKE circuitry can also provide for HW acceleration of computational primitives required to perform ECC over prime fields and binary fields. The form of wide integer multiplication applicable to modular exponentiation (as describe above) is also applicable to ECC over prime fields in PKE.

Another implementation of PKE makes the additional provision to support modular multiplication for the case two specific ECC standards, namely, NIST—P256, P384, Bernstein Curves—X25519, X448 and PRC standard SM2. The reasons for this additional provision in the PKE multiplier are twofold: these curves are very widely used among various ECC standards and this relatively inexpensive architecture improvement results in a ten-fold improvement in ECC performance for these curves.

For ECC based on binary extension fields, PKE supports a hardware multiplier (described in more detail with respect to FIG. 11 below) capable of multiplying two 576-bit binary polynomials in the GF(2) field. ECC and related computations form the foundation of the cryptographic framework of EPID and its application to anonymous attestation. ECC relies on the notion that points on elliptic curves defined over prime number fields (that is the coordinates of every point on the curve are integers between 0 and p) form a finite group, two points on the curve can be 'added' to generate a 3rd point on the curve shown in Equation (1):

$$y^2=x^3+ax+b \tag{1}$$

where a, b, x and y are all integers less than p for some prime number p.

ECC is based on the notion that, when a point P on the elliptic curve is added to itself k times, it generates another point Q=[k]P. In the ECC system, a secret integer p is chosen at the private key and Q=[p]G, for a well-known point G on the curve will be its public key. ECC relies on the fact that given G and Q and knowing the parameters of that define the elliptic curve, it is computationally intractable to know the value of p, the private key. In general, ECC point multiplication of finding [k]G, given k and G is very cumbersome, especially considering that realistic crypto protocols employ ECC point groups in number fields defined by a prime number of 256 or more number of bits.

Remote anonymous attention is a cryptographic protocol that applies a unique private key (e.g., EPID) to extend the notion of PKC to usage models to anonymous attestation and revocation. In anonymous attestation, many members in an identity group can prove their membership in the group to a verifier without having to disclose their individual identities. In this scheme, there are three principal entities—an issuer of private keys, group members each of which gets its own private key and a verifier, who can also be viewed as service provider to the group members. The issuer assigns a unique private key (e.g., an EPID) to each member of the group, through what is called a JOIN protocol, which is executed once in the life of each member. At the end of join protocol, the member gets a private key, which is unknown to the issuer. The public key is common to all the members of the group and is provided to any prospective verifier (or service provider). Members can prove their membership by signing a challenge provided by the verifier. The process of proving and verification comprises a zero-knowledge proof. A key benefit of anonymous attention is members can prove their membership or subscription to the group, without disclosing their individual identities.

Revocation can involve revocation of keys. Compromised keys can be identified by both the key values and transactions signed by the keys (where the key itself is not known) and the revocation lists are maintained by the verifier. The verifier checks new signatures against the revocation lists before accepting them.

Bilinear maps over elliptic curve groups provide the cryptographic foundation for anonymous attestation. In this scheme, two elliptic curve groups G1 and G2 are chosen, such that there is bilinear mapping f from G1×G2 to another cyclic group G, such that for every pair of point X in G1 and Y in G2 (respectively), the following statement holds true:

$$\text{if } f(X,Y)=Z, \text{ then } f(kX,gY)=kgZ \tag{2},$$

where all the multiplications denote multiplication of points in respective elliptic curve groups.

Anonymous attestation uses a third group G3 and defines public and private keys through the use of G1, G2, f(G1, G2) and G3. All computations involving the derivation of the public key, join operation, signature generation and signature verification involve several elliptic curve point multiplication.

Figure 10:
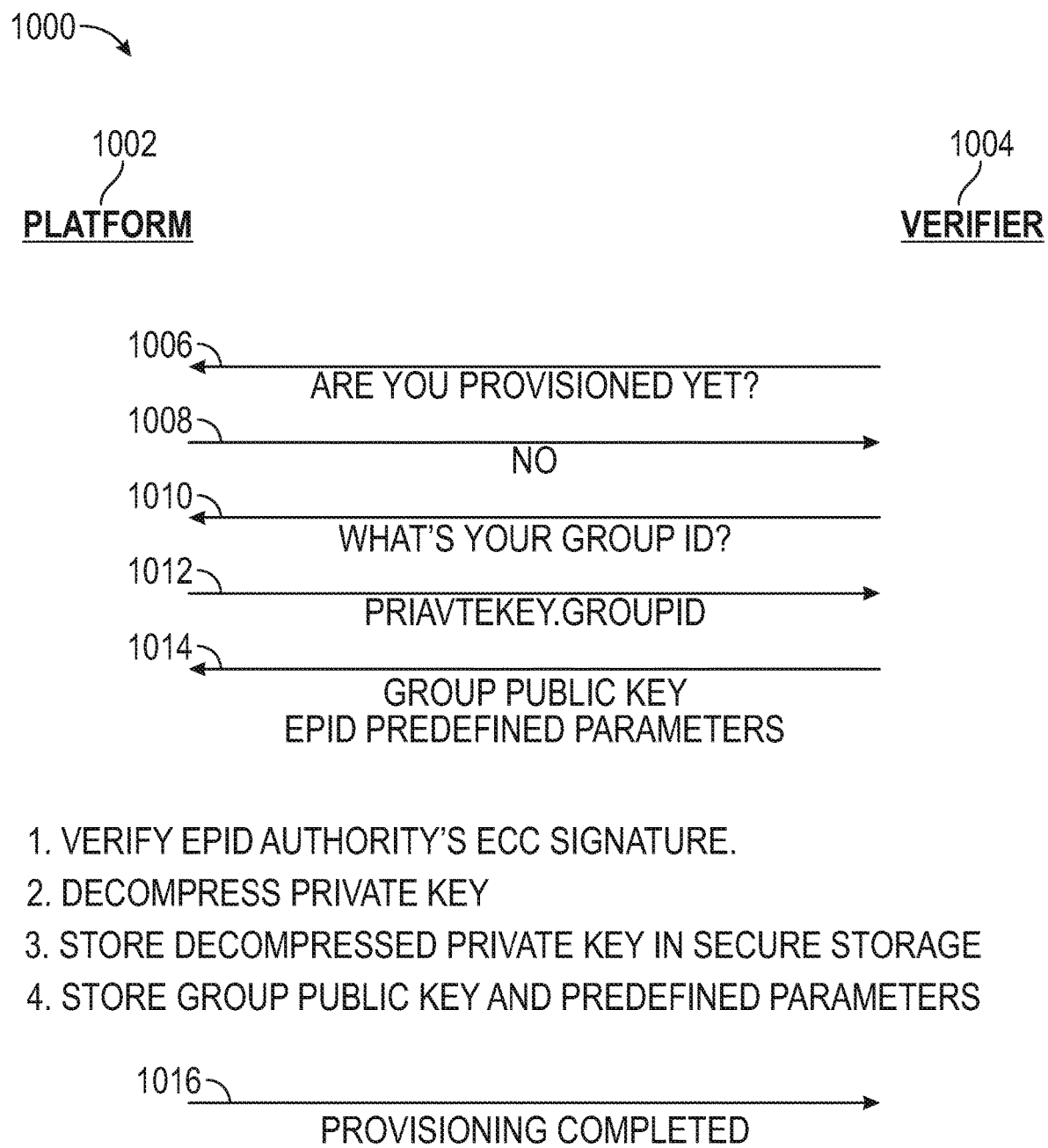
FIG. 10 illustrates an ecosystem according to an example.

FIG. 10 illustrates an ecosystem 1000 according to an example. The ecosystem 1000 can relate to EPID although examples are not limited thereto. An authority (e.g., EPID authority) is responsible for creating groups (e.g., EPID groups) and generating private keys and is responsible for revoking members and groups. The EPID authority has a root ECC key for signing group public keys, EPID predefined parameters, and revocation lists. A platform 1002 can be an end-consumer device that receives services (e.g., layered devices 302, 304, 306 (FIG. 3) or any of the user devices shown in FIG. 1 and FIG. 2). A verifier 1004 can be a service provider that provides premium services for the specific device. It will be appreciated that multiple platforms 1002 can receive services simultaneously or nearly simultaneously, and may request verifications and attestations of the verifier 1004 simultaneously or nearly simultaneously.

In message 1006, the verifier 1004 queries the platform 1002 as to whether the platform 1002 has received keys yet. If the platform 1002 has not received keys yet (as provided in notification 1008), the verifier 1004 requests (message 1010) the group ID of the platform 1002. The platform provides PrivateKey.GroupId in message 1012 and the verifier 1004 provides a group public key in message 1014. The platform 1002 performs operations including verifying the EPID authority's ECC signature, decompressing the private key, storing the decompressed private key in secure storage, and storing the group public key and predefined parameters. Then the platform 1002 notifies the verifier 1004 that provisioning is complete in message 1016.

The EPID algorithm uses four mathematical groups: G1, G2, G3, and GT. The groups G1, G2, and G3 are elliptic curve groups. The group GT is a finite field group.

G1 is 512 bits in size. An element of G1 takes the format of (x, y) where x and y are big integers ranging from 0 to q−1 inclusive.

G2 is 1536 bits in size. An element of G2 takes the format of (x[0], x[1], x[2], y[0], y[1], y[2]), where x[i] and y[i] are big integers ranging from 0 to q−1 inclusive.

G3 is 512 bits in size. An element of G3 takes the format of (x, y) where x and y are big integers ranging from 0 to q−1 inclusive.

GT is 1536 bits in size. An element of GT takes the format of (x[0], x[1], . . . , x[5]), where x[i] is a big integer ranging from 0 to q−1 inclusive.

All EPID groups share the same predefined parameters for G1, G2, G3, and GT. These groups are defined by the following parameters:

Parameters of elliptic curve group G1:
- p (256-bit), a prime
- q (256-bit), a prime
- h (32-bit), a small integer, also denoted as cofactor
- a (256-bit), an integer ranging from 0 to q−1 inclusive
- b (256-bit), an integer ranging from 0 to q−1 inclusive
- g1 (512-bit), a generator (an element) of G1

Parameters of elliptic curve group G2:
- p (256-bit), same as in G1
- q (256-bit), same as in G1
- a (256-bit), same as in G1
- b (256-bit), same as in G1
- coeff (768-bit), the coefficients of an irreducible polynomial
- coeff[0], coeff[1], coeff[2]: 256-bit integers ranging from 0 to q−1 inclusive
- qnr (256-bit), a quadratic nonresidue (an integer ranging from 0 to q−1 inclusive)
- orderG2 (768-bit), the total number of points in G2 elliptic curve
- g2 (1536-bit), a generator (an element) of G2

Parameters of elliptic curve group G3:
- p' (256-bit), a prime
- q' (256-bit), a prime
- h' (32-bit), a small integer, usually 1, also denoted as cofactor'
- a' (256-bit), an integer between ranging from 0 to q'−1 inclusive
- b' (256-bit), an integer between ranging from 0 to q'−1 inclusive
- g3 (512-bit), a generator (an element) of G3

Parameters of finite field group GT:
- q (256-bit), same as in G1
- coeff (768-bit), same as in G2
- qnr (256-bit), same as in G2

The public key of an EPID group consists of the following elements:
- Group ID (at least 32 bits, though some examples may have Group IDs of 64 bits or 128 bits)
- h1 (512 bits): An element in G1
- h2 (512 bits): An element in G1
- w (1536 bits): An element in a predefined 1536-bit elliptic curve group G2.

Although the group public key and predefined parameters are not secrets, the platform must verify that what is sent by the verifier is trustworthy. The EPID group pubic key and the predefined parameters are digitally signed by the EPID authority using ECDSA.2. The EPID authority's ECC public key is hardcoded in all platform devices. The platform verifies the EPID authority's ECDSA signature before using the data sent by the verifiers to perform the private key decompression.

Figure 11:
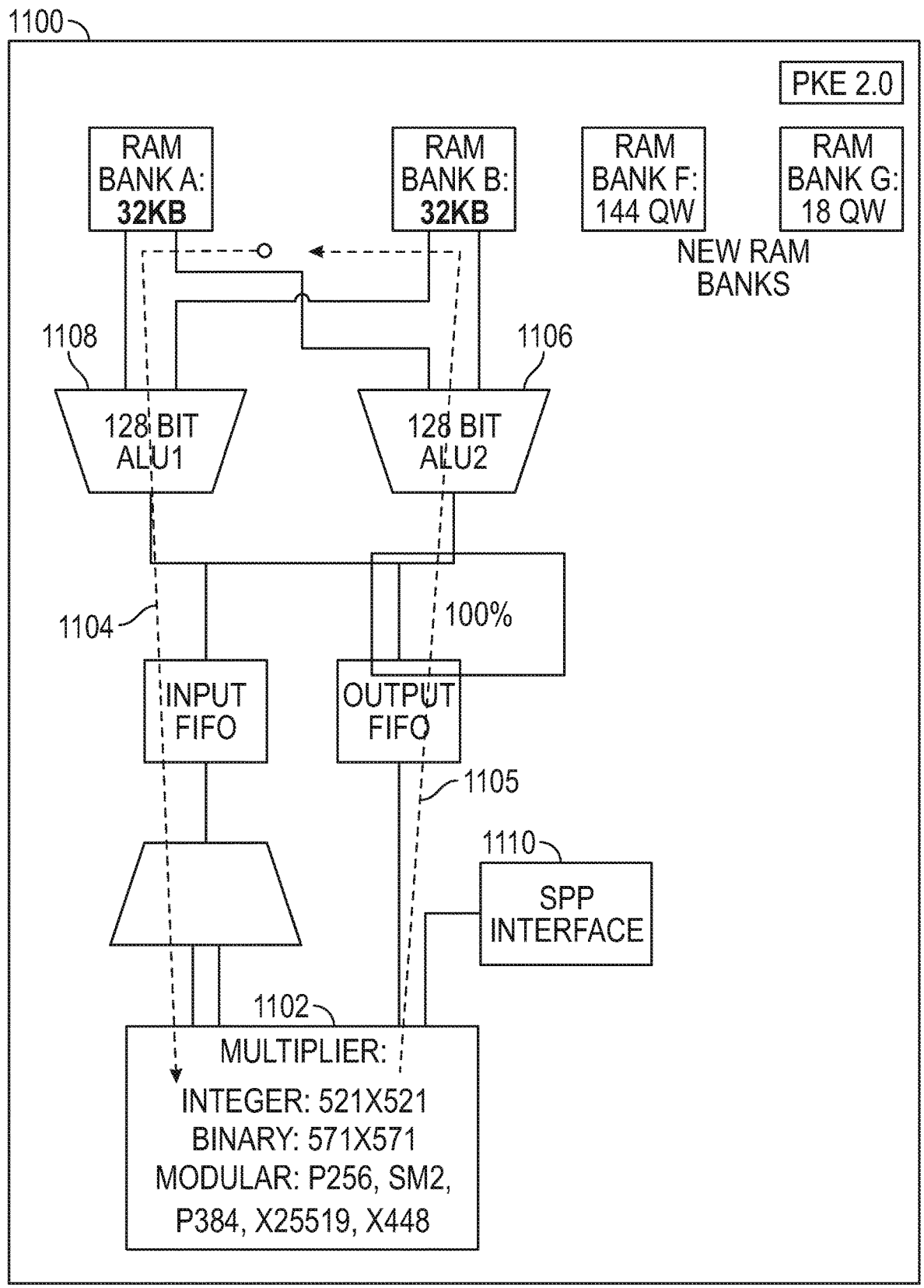
FIG. 11 illustrates a system for performing computations for public key encryption (PKE) according to an example.

FIG. 11 illustrates a system 1100 for performing computations for public key encryption (PKE) according to an example. The prime numbers that define the underlying integer field have a special structure that lends to the efficient processing of modular reduction operations (as in *x*y mod M{*}) by interleaving the residue calculation with the underlying 'raw' multiplication operation. For a small additional HW complexity, this method will improve the performance of ECC operations involving these curves by an order of magnitude.

Figure 12:
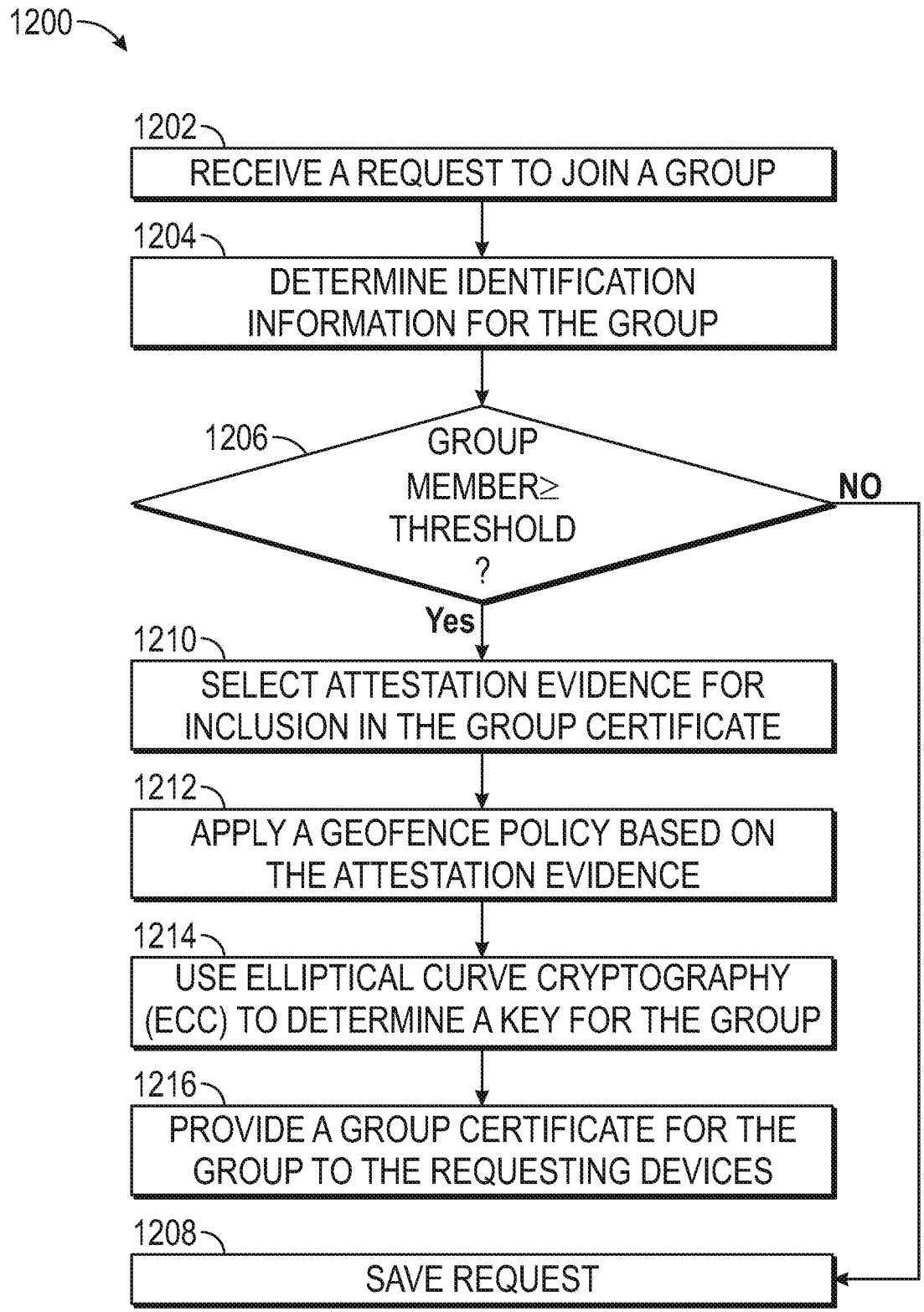
FIG. 12 illustrates a flowchart of a method executed by an apparatus operating as a certificate authority (CA) according to an example.

FIG. 12 illustrates a flowchart of a method 1200 executed by an apparatus operating as a certificate authority (CA) according to an example. The method 1200 can be performed by processing circuitry (e.g., processing circuitry 1832 (FIG. 18)) of any computing system, for example, a computing system in a data center, or an edge computing component, a mobile device, etc.

Method 1200 can begin with operation 1202 with the processing circuitry receive a request to join a group. The request can include parameters similar to those shown in FIG. 8 although examples are not limited thereto.

Method 1200 can continue with operation 1204 with the processing circuitry determine identification information for the group. The processing circuitry can make this determination based on performing a hash operation based on the TCI as described earlier herein with reference to FIGS. 3-4. If, upon identifying the group the processing circuitry determines (operation 1206) that the group size is smaller than a threshold, the processing circuitry may refrain (operation 1208) from creating the group or taking any other further action other than storing the request. Otherwise, in operation 1210 the processing circuitry can obtain (e.g., from information included in the request) attestation evidence and then select attestation evidence for inclusion in the group certificate. In operation 1212, this attestation evidence, if location-based, can be used to apply a geofence policy. In operation 1216, the processing circuitry can use ECC to determine a key as described earlier herein with reference to FIG. 11 and provide, in operation 1218, at least this key and any other information (e.g., a group certificate) for the group responsive to the original request of operation 1202.

Figure 13:
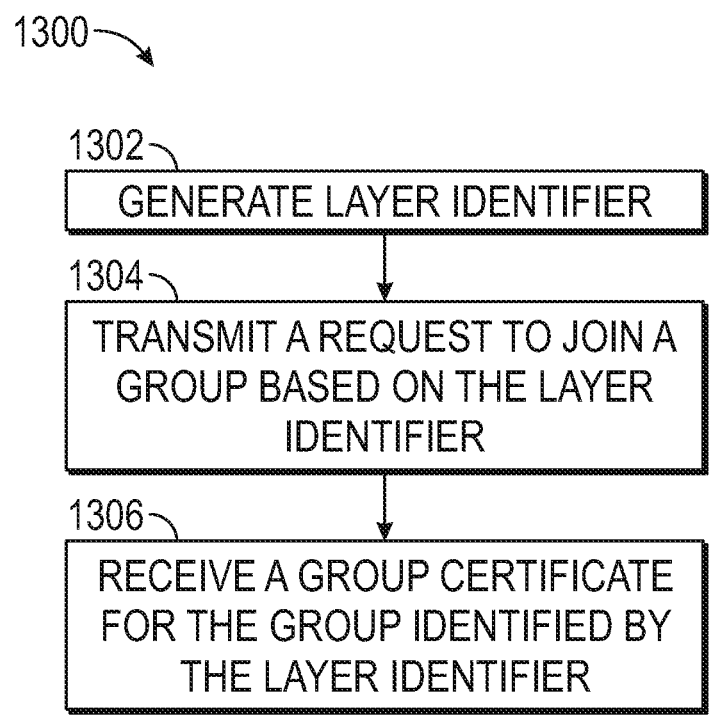
FIG. 13 illustrates a flowchart of a method executed by an apparatus for a node to operate in an edge computing network according to an example.

FIG. 13 illustrates a flowchart of a method 1300 executed by an apparatus for a node to operate in an edge computing network according to an example. The method can be performed by processing circuitry (e.g., processor 1832 (FIG. 18) of any mobile or fixed device described herein.

The method 1300 can begin with operation 1302 with the processing circuitry configuring a layer identifier to identify a layer of the respective device corresponding to the apparatus. Operation 1302 can be performed similarly as described above with reference to FIGS. 3-5.

The method 1300 continues with operation 1304 with the processing circuitry transmit a request to join a group based on the layer identifier. The request can be transmitted to any CA of any type as described herein with reference to at least FIGS. 1-3 although examples are not limited thereto. The request can include at least a layer identifier and attestation evidence although other information can be included. In response to the request, the processing circuitry can receive, in operation 1306, receive, responsive to the request, a group certificate for the group identified by the layer identifier. However, in some examples the request can be queued up if the CA determines that the group size of the group being requested is not large enough, or for any other reason.

Other Apparatuses, Systems and Methods

As described earlier herein, some examples can be implemented through communication with a remote data center. However, it is anticipated that many example implementations will be implemented using edge computing.

Figure 14:
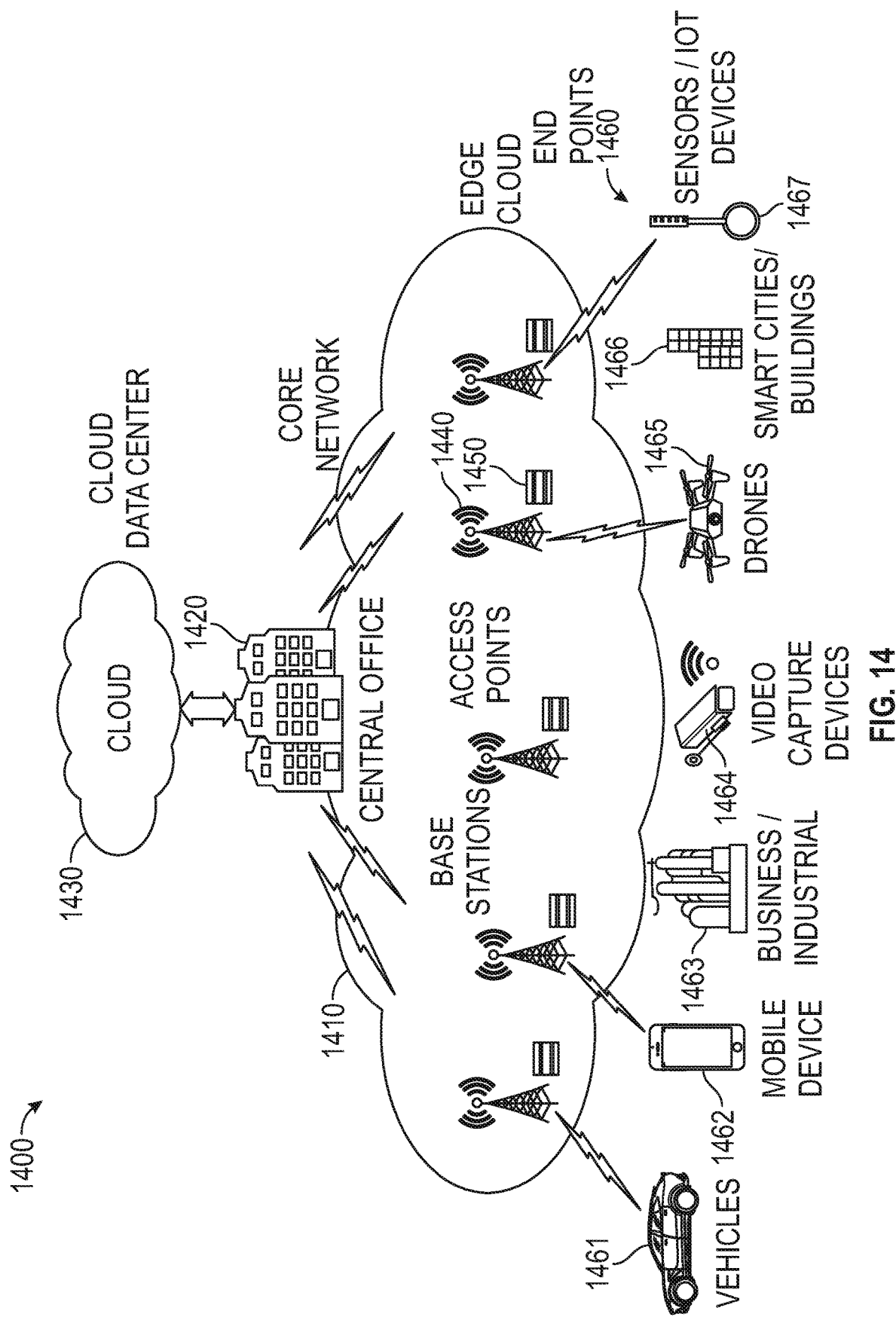
FIG. 14 illustrates an overview of an edge cloud configuration for edge computing, according to an example.

FIG. 14 is a block diagram 1400 showing an overview of a configuration for edge computing, which includes a layer of processing referenced in many of the current examples as an "edge cloud". This network topology, which may include a number of conventional networking layers (including those not shown herein), may be extended through use of the secure memory management techniques and the compute and network configurations discussed herein.

As shown, the edge cloud 1410 is co-located at an edge location, such as the base station 1440, a local processing hub 1450, or a central office 1420, and thus may include multiple entities, devices, and equipment instances. The edge cloud 1410 is located much closer to the endpoint (consumer and producer) data sources 1460 (e.g., autonomous vehicles 1461, user equipment 1462, business and industrial equipment 1463, video capture devices 1464, drones 1465, smart cities and building devices 1466, sensors and IoT devices 1467, etc.) than the cloud data center 1430. Compute, memory, and storage resources which are offered at the edges in the edge cloud 1410 are critical to providing ultra-low latency response times for services and functions used by the endpoint data sources 1460 as well as reduce network backhaul traffic from the edge cloud 1410 toward cloud data center 1430 thus improving energy consumption and overall network usages among other benefits.

Compute, memory, and storage are scarce resources, and generally decrease depending on the edge location (e.g., fewer processing resources being available at consumer end point devices than at a base station or at a central office). However, the closer that the edge location is to the endpoint (e.g., UEs), the more that space and power is constrained. Thus, edge computing, as a general design principle, attempts to minimize the amount of resources needed for network services, through the distribution of more resources which are located closer both geographically and in network access time.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance); configurations based on the type of compute, memory, storage, fabric, acceleration, or like resources available to edge locations, tiers of locations, or groups of locations; the service, security, and management and orchestration capabilities; and related objectives to achieve usability and performance of end services.

Edge computing is a developing paradigm where computing is performed at or closer to the "edge" of a network, typically through the use of a compute platform implemented at base stations, gateways, network routers, or other devices which are much closer to end point devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with compute hardware that performs virtualized network functions and offers compute resources for the execution of services and consumer functions for connected devices. These and other scenarios may be enhanced with the use of microservices and secure data management and sharing, as discussed in more detail below.

In contrast to the network architecture of FIG. 14, traditional endpoint (e.g., UE, vehicle-to-vehicle (V2V), vehicle-to-everything (V2X), etc.) applications are reliant on local device or remote cloud data storage and processing to exchange and coordinate information. A cloud data arrangement allows for long-term data collection and storage, but is not optimal for highly time varying data, such as a collision, traffic light change, etc. and may fail in attempting to meet latency challenges.

Depending on the real-time requirements in a communications context, a hierarchical structure of data processing and storage nodes may be defined in an edge computing deployment. For example, such a deployment may include local ultra-low-latency processing, regional storage and processing as well as remote cloud data-center based storage and processing. Key performance indicators (KPIs) may be used to identify where sensor data is best transferred and where it is processed or stored. This typically depends on the ISO layer dependency of the data. For example, lower layer (PHY, MAC, routing, etc.) data typically changes quickly and is better handled locally in order to meet latency requirements. Higher layer data such as Application Layer data is typically less time critical and may be stored and processed in a remote cloud data-center.

Figure 15:
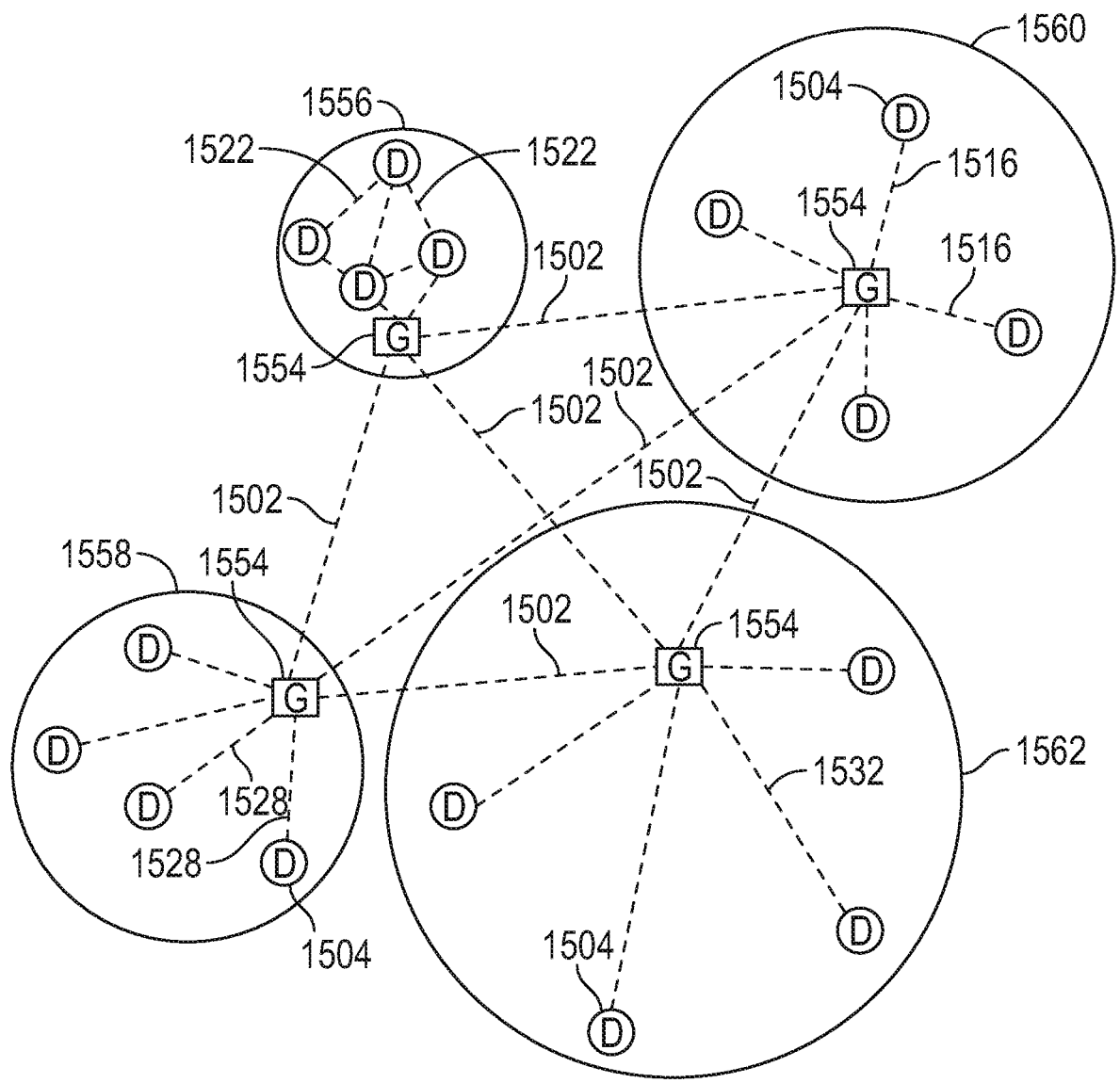
FIG. 15 illustrates a domain topology for respective Internet-of-Things (IoT) networks, according to an example.

FIG. 15 specifically provides a simplified drawing of a domain topology that may be used for a number of IoT networks comprising IoT devices 1504, with the IoT networks 1556, 1558, 1560, 1562, coupled through backbone links 1202 to respective gateways 1554. For example, a number of IoT devices 1504 may communicate with a gateway 1554, and with each other through the gateway 1554. To simplify the drawing, not every IoT device 1504, or communications link (e.g., link 1516, 1522, 1528, or 1532) is labeled. The backbone links 1502 may include any number of wired or wireless technologies, including optical networks, and may be part of a local area network (LAN), a wide area network (WAN), or the Internet. Additionally, such communication links facilitate optical signal paths among both IoT devices 1504 and gateways 1554, including the use of MUXing/deMUXing components that facilitate interconnection of the various devices.

The network topology may include any number of types of Ica networks, such as a mesh network provided with the network 1556 using Bluetooth low energy (BLE) links 1222. Other types of IoT networks that may be present include a wireless local area network (WLAN) network 1558 used to communicate with IoT devices 1504 through IEEE 802.11 (Wi-Fi®) links 1528, a cellular network 1560 used to communicate with IoT devices 1504 through an LTE/LTE-A (4G) or 5G cellular network, and a low-power wide area (LPWA) network 1562, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 1504, such as over the backbone links 1502, may be protected by a decentralized system for authentication, authorization, and accounting (AAA). In a decentralized AAA system, distributed payment, credit, audit, authorization, and authentication systems may be implemented across interconnected heterogeneous network infrastructure. This enables systems and networks to move towards autonomous operations. In these types of autonomous operations, machines may even contract for human resources and negotiate partnerships with other machine networks. This may enable the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may enable systematic and autonomous communication and coordination of service delivery against contractual service objectives, orchestration and QoS-based swarming and fusion of resources. Some of the individual examples of network-based resource processing include the following.

The mesh network 1556, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 1558, for instance, may use systems that perform standards conversion to provide multi-standard connectivity, enabling IoT devices 1504 using different protocols to communicate. Further systems may provide seamless interconnectivity across a multi-standard infrastructure comprising visible Internet resources and hidden Internet resources.

Communications in the cellular network 1560, for instance, may be enhanced by systems that offload data, extend communications to more remote devices, or both. The LPWA network 1562 may include systems that perform non-Internet protocol (IP) to IP interconnections, addressing, and routing. Further, each of the IoT devices 1504 may include the appropriate transceiver for wide area communications with that device. Further, each IoT device 1504 may include other transceivers for communications using additional protocols and frequencies. This is discussed further with respect to the communication environment and hardware of an IoT processing device depicted in FIG. 17.

Finally, clusters of IoT devices may be equipped to communicate with other IoT devices as well as with a cloud network. This may enable the IoT devices to form an ad-hoc network between the devices, enabling them to function as a single device, which may be termed a fog device, fog platform, or fog network. This configuration is discussed further with respect to FIG. 17 below.

Figure 16:
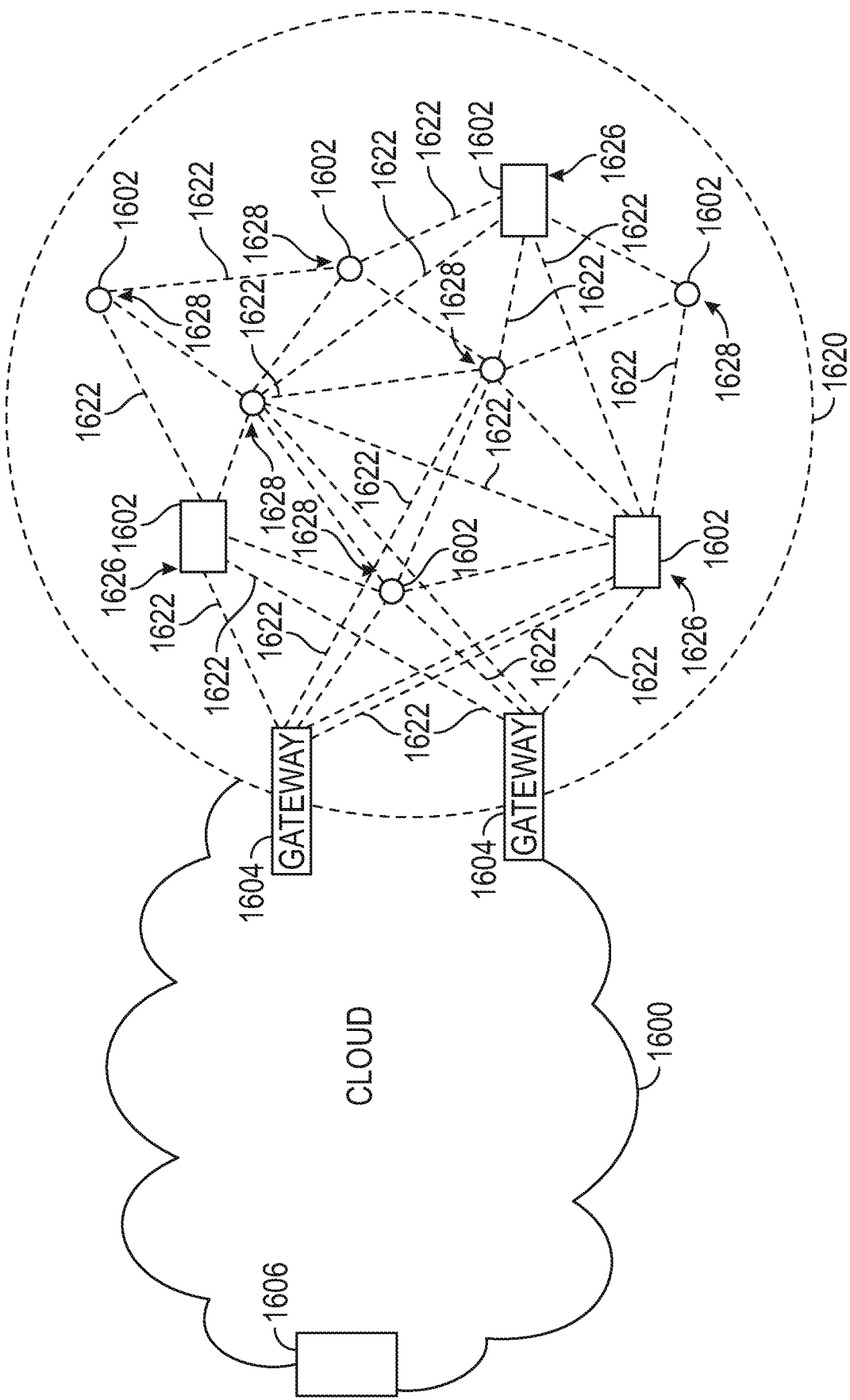
FIG. 16 illustrates a cloud computing network in communication with a network of IoT devices at the edge of a cloud computing network, according to an example.

FIG. 16 illustrates a cloud computing network in communication with a mesh network of IoT devices (devices 1602) operating as a fog platform in a networked scenario. The mesh network of Ica devices may be termed a fog network 1620, established from a network of devices operating at the edge of the cloud 1600. To simplify the diagram, not every IoT device 1602 is labeled.

The fog network 1620 may be considered to be a massively interconnected network wherein a number of IoT devices 1602 are in communications with each other, for example, by radio links 1622. The fog network 1620 may establish a horizontal, physical, or virtual resource platform that can be considered to reside between IoT edge devices and cloud or data centers. A fog network, in some examples, may support vertically-isolated, latency-sensitive applications through layered, federated, or distributed computing, storage, and network connectivity operations. However, a fog network may also be used to distribute resources and services at and among the edge and the cloud. Thus, references in the present document to the "edge", "fog", and "cloud" are not necessarily discrete or exclusive of one another.

As an example, the fog network 1620 may be facilitated using an interconnect specification released by the Open Connectivity Foundation™ (OCF). This standard enables devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 1602 are shown in this example, gateways 1604, data aggregators 1626, and sensors 1628, although any combinations of IoT devices 1602 and functionality may be used. The gateways 1604 may be edge devices that provide communications between the cloud 1600 and the fog 1620, and may also provide the backend process function for data obtained from sensors 1628, such as motion data, flow data, temperature data, and the like. The data aggregators 1626 may collect data from any number of the sensors 1628, and perform the back end processing function for the analysis. The results, raw data, or both may be passed along to the cloud 1600 through the gateways 1604. The sensors 1628 may be full IoT devices 1602, for example, capable of both collecting data and processing the data. In some cases, the sensors 1628 may be more limited in functionality, for example, collecting the data and enabling the data aggregators 1628 or gateways 1604 to process the data.

Communications from any IoT device 1602 may be passed along a convenient path (e.g., a most convenient path) between any of the IoT devices 1602 to reach the gateways 1604. In these networks, the number of interconnections provide substantial redundancy, enabling communications to be maintained, even with the loss of a number of IoT devices 1602. Further, the use of a mesh network may enable IoT devices 1602 that are very low power or located at a distance from infrastructure to be used, as the range to connect to another IoT device 1602 may be much less than the range to connect to the gateways 1604.

The fog 1320 provided from these IoT devices 1302 may be presented to devices in the cloud 1600, such as a server 1606, as a single device located at the edge of the cloud 1600, e.g., a fog device. In this example, the alerts coming from the fog device may be sent without being identified as coming from a specific IoT device 1602 within the fog 1620. In this fashion, the fog 1620 may be considered a distributed platform that provides computing and storage resources to perform processing or data-intensive tasks such as data analytics, data aggregation, and machine-learning, among others.

In some examples, the IoT devices 1602 may be configured using an imperative programming style, e.g., with each IoT device 1602 having a specific function and communication partners. However, the IoT devices 1602 forming the fog device may be configured in a declarative programming style, enabling the IoT devices 1602 to reconfigure their operations and communications, such as to determine needed resources in response to conditions, queries, and device failures. As an example, a query from a user located at a server 1606 about the operations of a subset of equipment monitored by the IoT devices 1602 may result in the fog 1620 device selecting the IoT devices 1602, such as particular sensors 1628, needed to answer the query. The data from these sensors 1628 may then be aggregated and analyzed by any combination of the sensors 1628, data aggregators 1626, or gateways 1604, before being sent on by the fog 1620 device to the server 1606 to answer the query. In this example, IoT devices 1602 in the fog 1620 may select the sensors 1628 used based on the query, such as adding data from flow sensors or temperature sensors. Further, if some of the IoT devices 1602 are not operational, other IoT devices 1602 in the fog 1620 device may provide analogous data, if available.

In other examples, the operations and functionality described above may be embodied by an IoT device machine in the example form of an electronic processing system, within which a set or sequence of instructions may be executed to cause the electronic processing system to perform any one of the methodologies discussed herein, according to an example. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, these and like examples to a processor-based system shall be taken to include any set of one or more machines that are controlled by or operated by a processor, set of processors, or processing circuitry (e.g., a machine in the form of a computer, UE, MEC processing device, IoT processing device, etc.) to individually or jointly execute instructions to perform any one or more of the methodologies discussed herein. Accordingly, in various examples, applicable means for processing (e.g., processing, controlling, generating, evaluating, etc.) may be embodied by such processing circuitry.

FIG. 1700 illustrates a drawing of a cloud computing network, or cloud 1700, in communication with a number of IoT devices. The cloud 1700 may represent the Internet, or may be a local area network (LAN), or a wide area network (WAN), such as a proprietary network for a company. The IoT devices may include any number of different types of devices, grouped in various combinations. For example, a traffic control group 1706 may include IoT devices along streets in a city. These IoT devices may include stoplights, traffic flow monitors, cameras, weather sensors, and the like. The traffic control group 1706, or other subgroups, may be in communication with the cloud 1700 through wired or wireless links 1708, such as LPWA links, optical links, and the like. Further, a wired or wireless sub-network 1712 may allow the IoT devices to communicate with each other, such as through a local area network, a wireless local area network, and the like. The IoT devices may use another device, such as a gateway 1710 or 1728 to communicate with remote locations such as the cloud 1700; the IoT devices may also use one or more servers 1730 to facilitate communication with the cloud 1700 or with the gateway 1710. For example, the one or more servers 1730 may operate as an intermediate network node to support a local edge cloud or fog implementation among a local area network. Further, the gateway 1728 that is depicted may operate in a cloud-to-gateway-to-many edge devices configuration, such as with the various IoT devices 1714, 1720, 1724 being constrained or dynamic to an assignment and use of resources in the cloud 1700.

Other example groups of IoT devices may include remote weather stations 1714, local information terminals 1716, alarm systems 1718, automated teller machines 1720, alarm panels 1722, or moving vehicles, such as emergency vehicles 1724 or other vehicles 1726, among many others. Each of these IoT devices may be in communication with other IoT devices, with servers 1704, with another IoT fog platform or system, or a combination therein. The groups of Ica devices may be deployed in various residential, commercial, and industrial settings (including in both private or public environments).

Figure 17:
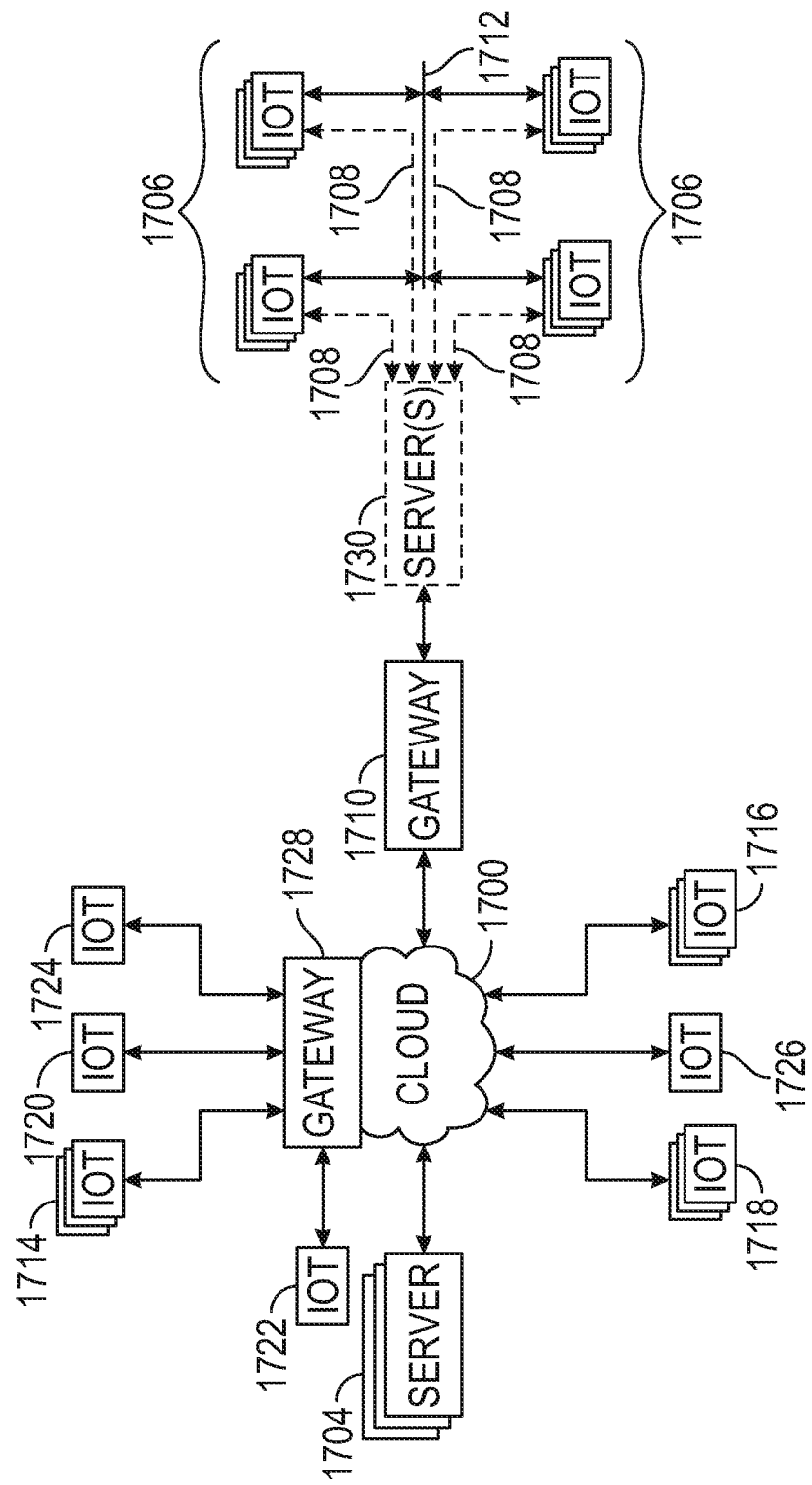
FIG. 17 includes a block diagram of a network illustrating communications among a number of IoT devices, according to an example.

As may be seen from FIG. 17, a large number of IoT devices may be communicating through the cloud 1700. This may allow different IoT devices to request or provide information to other devices autonomously. For example, a group of IoT devices (e.g., the traffic control group 1706) may request a current weather forecast from a group of remote weather stations 1714, which may provide the forecast without human intervention. Further, an emergency vehicle 1724 may be alerted by an automated teller machine 1720 that a burglary is in progress. As the emergency vehicle 1724 proceeds towards the automated teller machine 1720, it may access the traffic control group 1706 to request clearance to the location, for example, by lights turning red to block cross traffic at an intersection in sufficient time for the emergency vehicle 1724 to have unimpeded access to the intersection.

Clusters of IoT devices, such as the remote weather stations 1714 or the traffic control group 1706, may be equipped to communicate with other IoT devices as well as with the cloud 1700. This may allow the IoT devices to form an ad-hoc network between the devices, allowing them to function as a single device, which may be termed a fog platform or system (e.g., as described above with reference to FIG. 16).

Figure 18:
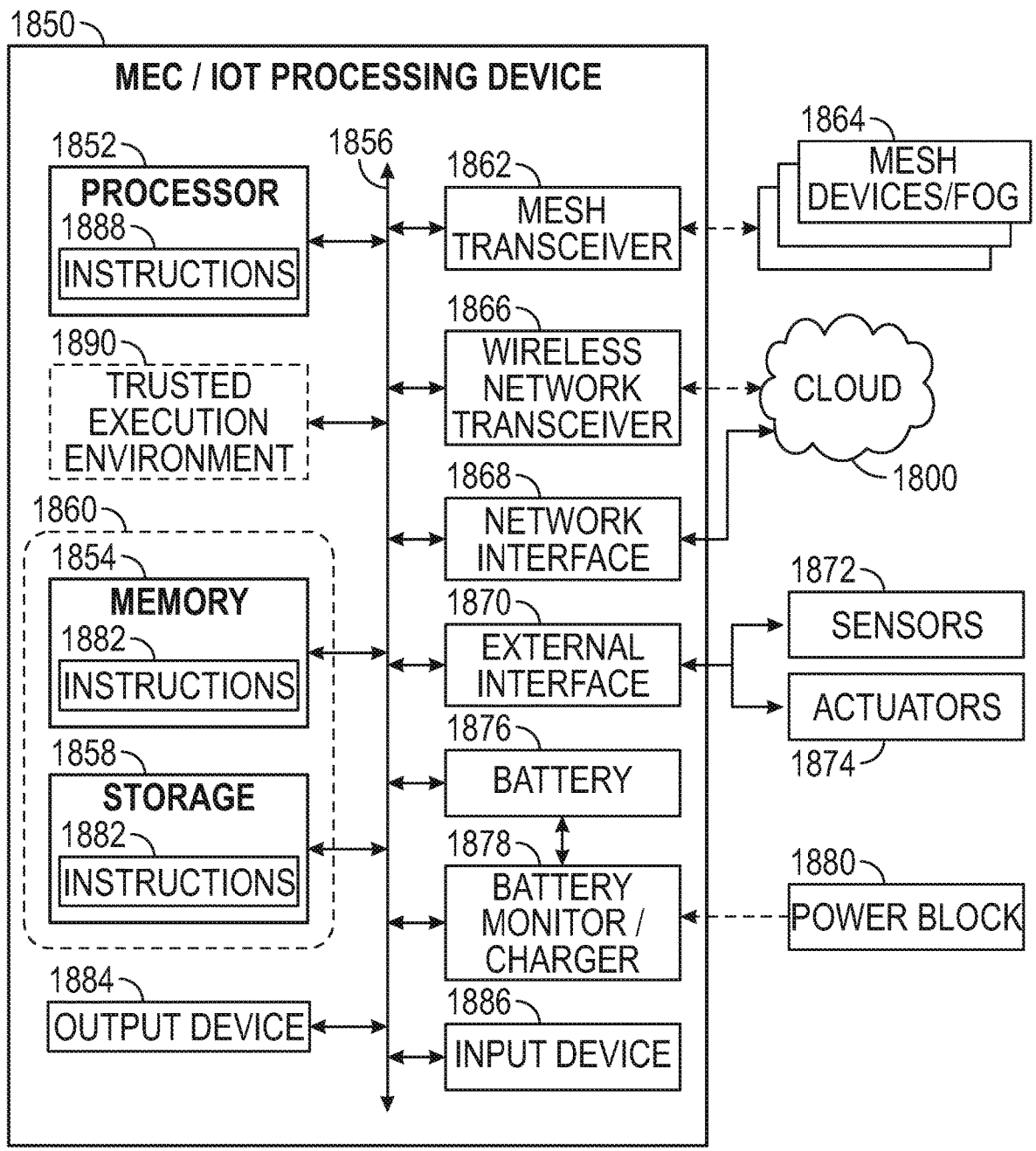
FIG. 18 includes a block diagram for an IoT or Edge processing system architecture in which any one or more of the techniques (e.g., operations, processes, methods; and methodologies) discussed herein may be performed, according to an example.

FIG. 18 is a block diagram of an example of components that may be present in an edge processing device 1850 (e.g., a computer, IoT device, edge server, etc.) for implementing any of the techniques described herein. The device 1850 may include any combinations of the components shown in the example or referenced in the disclosure above. The components may be implemented as ICs, portions thereof, discrete electronic devices, or other modules, logic, hardware, software, firmware, or a combination thereof adapted in the device 1850, or as components otherwise incorporated within a chassis of a larger system. Additionally, the block diagram of FIG. 18 is intended to depict a high-level view of components of the device 1850. However, some of the components shown may be omitted, additional components may be present, and different arrangement of the components shown may occur in other implementations.

The device 1850 may include processing circuitry in the form of a processor 1852, which may be a microprocessor, a multi-core processor, a multithreaded processor, an ultra-low voltage processor, an embedded processor, or other known processing elements. The processor 1852 may be a part of a system on a chip (SoC) in which the processor 1852 and other components are formed into a single integrated circuit, or a single package, such as the Edison™ or Galileo™ SoC boards from Intel. As an example, the processor 1852 may include an Intel® Architecture Core™ based processor, such as a Quark™, an Atom™, an i3, an i5, an i7, or an MCU-class processor, or another such processor available from Intel® Corporation, Santa Clara, California. However, any number other processors may be used, such as available from Advanced Micro Devices, Inc. (AMID) of Sunnyvale, California, a MIPS-based design from MIPS Technologies, Inc. of Sunnyvale, California, an ARM-based design licensed from ARM Holdings, Ltd. or customer thereof, or their licensees or adopters. The processors may include units such as an A5-A12 processor from Apple® Inc., a Snapdragon™ processor from Qualcomm® Technologies, Inc., or an OMAP™ processor from Texas Instruments, Inc.

The processor 1852 may communicate with a system memory 1854 over an interconnect 1856 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2 LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMIMs) of different varieties including but not limited to microDIMMs or MiniDIMMs.

To provide for persistent storage of information such as data, applications, operating systems and so forth, a storage 1858 may also couple to the processor 1852 via the interconnect 1856. In an example the storage 1858 may be implemented via a solid state disk drive (SSDD). Other devices that may be used for the storage 1858 include flash memory cards, such as SD cards, microSD cards, xD picture cards, and the like, and USB flash drives. In low power implementations, the storage 1858 may be on-die memory or registers associated with the processor 1852. However, in some examples, the storage 1858 may be implemented using a micro hard disk drive (HDD). Further, any number of new technologies may be used for the storage 1858 in addition to, or instead of, the technologies described, such resistance change memories, phase change memories, holographic memories, or chemical memories, among others.

The components may communicate over the interconnect 1856. The interconnect 1856 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1856 may be a proprietary bus, for example, used in a SoC based system. Other bus systems may be included, such as an I2C interface, an SPI interface, point to point interfaces, and a power bus, among others.

The interconnect 1856 may couple the processor 1852 to a mesh transceiver 1852, for communications with other mesh devices 1864. The mesh transceiver 1852 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 1864. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 1852 may communicate using multiple standards or radios for communications at different range. For example, the device 1850 may communicate with close devices, e.g., within about 10 meters, using a local transceiver based on BLE, or another low power radio, to save power. More distant mesh devices 1864, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 1866 may be included to communicate with devices or services in the cloud 1800 via local or wide area network protocols. The wireless network transceiver 1866 may be a LPWA transceiver that follows the IEEE 802.15.4, or IEEE 802.15.4g standards, among others. The device 1860 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 1852 and wireless network transceiver 1866, as described herein. For example, the radio transceivers 1852 and 1866 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 1852 and 1866 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It may be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, in addition to the standards listed above, any number of satellite uplink technologies may be used for the wireless network transceiver 1866, including, for example, radios compliant with standards issued by the ITU (International Telecommunication Union), or the ETSI (European Telecommunications Standards institute), among others. The examples provided herein are thus understood as being applicable to various other communication technologies, both existing and not yet formulated.

A network interface controller (NIC) 1868 may be included to provide a wired communication to the cloud 1800 or to other devices, such as the mesh devices 1864. The wired communication may provide an Ethernet connection, or may be based on other types of networks, such as Controller Area. Network (CAN), Local Interconnect Network (LIN), DeviceNet, ControlNet, Data Highway+, PROFIBUS, or PROFINET, among many others. An additional NIC 1868 may be included to enable connect to a second network, for example, a NIC 1868 providing communications to the cloud over Ethernet, and a second NIC 1868 providing communications to other devices over another type of network.

Given the variety of types of applicable communications from the device to another component or network, applicable communications circuitry used by the device may include or be embodied by any one or more of components 1852, 1866, 1868, or 1870. Accordingly, in various examples, applicable means for communicating (e.g., receiving, transmitting, etc.) may be embodied by such communications circuitry.

The interconnect 1856 may couple the processor 1852 to an external interface 1870 that is used to connect external devices or subsystems. The external devices may include sensors 1872, such as accelerometers, level sensors, flow sensors, optical light sensors, camera sensors, temperature sensors, a global positioning system (GPS) sensors, pressure sensors, barometric pressure sensors, and the like. The external interface 1870 further may be used to connect the device 1850 to actuators 1874, such as power switches, valve actuators, an audible sound generator, a visual warning device, and the like.

In some optional examples, various input/output (I/O) devices may be present within, or connected to, the device 1850. For example, a display or other output device 1884 may be included to show information, such as sensor readings or actuator position. An input device 1886, such as a touch screen or keypad may be included to accept input. An output device 1884 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the device 1850.

A battery 1876 may power the device 1850, although in examples in which the device 1850 is mounted in a fixed location, it may have a power supply coupled to an electrical grid. The battery 1876 may be a lithium ion battery, or a metal-air battery, such as a zinc-air battery, an aluminum-air battery, a lithium-air battery, and the like.

A battery monitor/charger 1878 may be included in the device 1850 to track the state of charge (SoCh) of the battery 1876. The battery monitor/charger 1878 may be used to monitor other parameters of the battery 1876 to provide failure predictions, such as the state of health (SoH) and the state of function (SoF) of the battery 1876. The battery monitor/charger 1878 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX The battery monitor/charger 1878 may communicate the information on the battery 1876 to the processor 1852 over the interconnect 1856. The battery monitor/charger 1878 may also include an analog-to-digital (ADC) convertor that enables the processor 1852 to directly monitor the voltage of the battery 1876 or the current flow from the battery 1876. The battery parameters may be used to determine actions that the device 1850 may perform, such as transmission frequency, mesh network operation, sensing frequency, and the like.

A power block 1880, or other power supply coupled to a grid, may be coupled with the battery monitor/charger 1878 to charge the battery 1876. In some examples, the power block 1880 may be replaced with a wireless power receiver to obtain the power wirelessly, for example, through a loop antenna in the device 1850. A wireless battery charging circuit, such as an LTC4020 chip from Linear Technologies of Milpitas, California, among others, may be included in the battery monitor/charger 1878. The specific charging circuits chosen depend on the size of the battery 1876, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1858 may include instructions 1882 in the form of software, firmware, or hardware commands to implement the techniques described herein. Although such instructions 1882 are shown as code blocks included in the memory 1854 and the storage 1858, it may be understood that any of the code blocks may be replaced with hardwired circuits, for example, built into an application specific integrated circuit (ASIC).

In an example, the instructions 1882 provided via the memory 1854, the storage 1858, or the processor 1852 may be embodied as a non-transitory, machine readable medium 1860 including code to direct the processor 1852 to perform electronic operations in the device 1850. The processor 1852 may access the non-transitory, machine readable medium 1860 over the interconnect 1856. For instance, the non-transitory, machine readable medium 1860 may be embodied by devices described for the storage 1858 or may include specific storage units such as optical disks, flash drives, or any number of other hardware devices. The non-transitory, machine readable medium 1860 may include instructions to direct the processor 1852 to perform a specific sequence or flow of actions, for example, as described with respect to the flowchart(s) and block diagram(s) of operations and functionality depicted above.

In further examples, a machine readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine readable medium" thus may include, but is not limited to, solid-state memories, and optical and magnetic media. Specific examples of machine readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine readable medium may further be transmitted or received over a communications network using a transmission medium via a network interface device utilizing any one of a number of transfer protocols (e.g., HTTP).

A machine readable medium may be provided by a storage device or other apparatus which is capable of hosting data in a non-transitory format. In an example, information stored or otherwise provided on a machine readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

ADDITIONAL EXAMPLES

Additional examples of the presently described method, system, and device embodiments include the following, non-limiting configurations. Each of the following non-limiting examples may stand on its own, or may be combined in any permutation or combination with any one or more of the other examples provided below or throughout the present disclosure.

Example 1 is an apparatus operating as a certificate authority (CA), the apparatus comprising processing circuitry; and a memory device including instructions embodied thereon, wherein the instructions, which when executed by the processing circuitry, configure the processing circuitry to perform operations to: receive, from a plurality of requesting devices, a request to join a group, the request including identification information for the group and attestation evidence for the plurality of requesting devices; and responsive to receiving the request, provide a group certificate for the group to the plurality of requesting devices.

In Example 2, the subject matter of Example 1 optionally includes wherein the request does not include information uniquely identifying a device of the plurality of requesting devices.

In Example 3, the subject matter of any of Examples 1-2 optionally includes wherein at least one device of the plurality of devices is a mobile device and wherein at least one device of the plurality of devices is a stationary device.

In Example 4, the subject matter of any of Examples 1-3 optionally includes wherein the operations further include verifying whether the group includes at least a threshold number of members and refraining from providing the group certificate if the group does not include at least the threshold number of members.

In Example 5, the subject matter of any of Examples 1-4 optionally includes wherein the identification information conforms to the Enhanced Privacy ID (EPID) family of standards.

In Example 6, the subject matter of Example 5 optionally includes wherein the identification information is a Trusted Computing Base (TCB) Component Identifier (TCI).

In Example 7, the subject matter of Example 6 optionally includes wherein the operations further include performing a hash operation based on the TCI to determine identification information for the group.

In Example 8, the subject matter of Example 6 optionally includes wherein the operations further include operations to use the attestation evidence to select attestation evidence for inclusion in the group certificate.

In Example 9, the subject matter of any of Examples 1-8 optionally includes wherein the apparatus is included in one or more of: a network interface, server, rack, data center, or mobile server.

In Example 10, the subject matter of any of Examples 1-9 optionally includes wherein the processing circuitry is a component of a device in the group that the plurality of requesting devices is requesting to join.

In Example 11, the subject matter of any of Examples 1-10 optionally includes wherein the operations further include using elliptical curve cryptography (ECC) to determine a key.

In Example 12, the subject matter of any of Examples 1-11 optionally includes wherein the attestation evidence is location-based.

In Example 13, the subject matter of Example 12 optionally includes wherein the operations further include applying a geofence policy based on the attestation evidence.

Example 14 is an apparatus for a node to operate in an edge computing network, the apparatus comprising: processing circuitry; and a memory device including instructions embodied thereon, wherein the instructions, which when executed by the processing circuitry, configure the processing circuitry to perform operations to: configure a layer identifier to identify a layer of the device; transmit a request to a certificate authority (CA) to join a group based on the layer identifier, the request including the layer identifier and attestation evidence; and receive, responsive to the request, a group certificate for the group identified by the layer identifier.

In Example 15, the subject matter of Example 14 can optionally include wherein the identifier is a Trusted TCB Component Identifier (TCI) in accordance with a standard of the Trusted Computed Group family of standards to identify a TCB layer of the device.

In Example 16, the subject matter of Example 15 can optionally include wherein the request further includes attestation evidence that indicates trustworthiness of the TCB layer.

In Example 17, the subject matter of any of Examples 14-16 can optionally include wherein the request does not include information uniquely identifying the device.

In Example 18, the subject matter of any of Examples 14-17 can optionally include wherein the CA is a device within the group.

Example 19 is at least one non-transitory machine-readable storage medium comprising instructions or stored data which may be configured into instructions, wherein the instructions, when configured and executed by processing circuitry of a computing device, cause the processing circuitry to perform any of the operations of Examples 1-18.

Example 20 may include one or more computer-readable storage media comprising data to cause an electronic device, upon loading, execution, configuration, or provisioning of the data by one or more processors or electronic circuitry of the electronic device, to perform one or more elements of a method described in or related to any of Examples 1-18, or any other method or process described herein.

Example 21 may include an apparatus comprising logic, modules, or circuitry to perform one or more elements of a method described in or related to any of Examples 1-18, or any other method or process described herein.

Example 22 may include a method, technique, or process as described in or related to any of Examples 1-18, or portions or parts thereof.

Example 23 may include an apparatus comprising: one or more processors and one or more computer readable media comprising instructions that, when executed by the one or more processors, cause, configure, or adapt the one or more processors to perform the method, techniques, or process as described in or related to any of Examples 1-18, or portions thereof.

Example 24 may include a signal as described in or related to any of examples 1-18, or portions or parts thereof.

Example 25 may include a signal in a wireless network as described in or related to any of Examples 1-18, or as otherwise shown and described herein.

Example 26 may include a method of performing or coordinating communications in a wireless network as described in or related to any of Examples 1-18, or as otherwise shown and described herein.

Example 27 may include a device for processing communication as described in or related to any of Examples 1-18, or as otherwise shown and described herein.

Example 28 is a network comprising respective devices and device communication mediums for performing any of the operations of Examples 1-18, or as otherwise shown and described herein.

Example 29 is a network interface card comprising circuitry, and implementing respective logic and functionality for performing any of the operations of Examples 1-18, or as otherwise shown and described herein.

Example 30 is an edge cloud computing device implementation comprising processing nodes and computing units adapted for performing any of the operations of Examples 1-18, or as otherwise shown and described herein.

Example 31 is an apparatus comprising means to implement of any of Examples 1-18.

Example 32 is a system to implement of any of Examples 1-18.

Example 33 is a method to implement of any of Examples 1-18.

In the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

What is claimed is:

1. An apparatus to operate as a certificate authority (CA), the apparatus comprising:
   processing circuitry; and
   a memory device including instructions embodied thereon, wherein the instructions, which when executed by the processing circuitry, configure the processing circuitry to perform operations to:
   receive, from each respective device of a plurality of requesting devices, a request to join a group, the request including identification information for the group and attestation evidence for the respective device;
   create a group certificate based on the attestation evidence received from each respective device, wherein the attestation evidence is generated by the respective device but does not uniquely identify the respective device;
   verify whether the group includes at least a threshold number of members; and
   responsive to receiving the request, provide the group certificate for the group to the plurality of requesting devices, wherein the apparatus refrains from providing the group certificate if the group does not include at least the threshold number of members.

2. The apparatus of claim 1, wherein at least one device of the plurality of requesting devices is a mobile device and wherein at least one device of the plurality of requesting devices is a stationary device.

3. The apparatus of claim 1, wherein the identification information for the group conforms to the Enhanced Privacy ID (EPID) family of standards.

4. The apparatus of claim 3, wherein the identification information for the group includes or is based on a Trusted Computing Base (TCB) Component Identifier (TCI).

5. The apparatus of claim 4, wherein the operations further include performing a hash operation based on the TCI to determine the identification information for the group.

6. The apparatus of claim 4, wherein the operations further include use of the attestation evidence received from each respective device to select attestation evidence for inclusion in the group certificate.

7. The apparatus of claim 1, wherein the apparatus is included in one or more of: a network interface, server, rack, data center, or mobile server.

8. The apparatus of claim 1, wherein the processing circuitry is a component of a device in the group that the plurality of requesting devices is requesting to join.

9. The apparatus of claim 1, wherein the operations further include using elliptical curve cryptography (ECC) to determine a key.

10. The apparatus of claim 1, wherein the attestation evidence is location-based.

11. The apparatus of claim 10, wherein the operations further include applying a geographic-based policy based on the attestation evidence that is location-based.

12. An apparatus for a node to operate in an edge computing network, the apparatus comprising:

processing circuitry; and a memory device including instructions embodied thereon, wherein the instructions, which when executed by the processing circuitry, configure the processing circuitry to perform operations to:
- configure a layer identifier to identify a layer of the node;
- transmit a request to a certificate authority (CA) to join a group based on the layer identifier, the request including the layer identifier and attestation evidence, wherein the attestation evidence is generated by the apparatus but does not uniquely identify the apparatus; and
- receive, responsive to the request, a group certificate for the group identified by the layer identifier, wherein the CA operates to create the group certificate based on the attestation evidence and provide the group certificate to a plurality of requesting devices that includes the apparatus, and wherein the CA uses the attestation evidence received from each respective device to select attestation evidence for inclusion in the group certificate.

13. The apparatus of claim 12, wherein the layer identifier is a Trusted Computing Base (TCB) Component Identifier (TCI) in accordance with a standard of the Trusted Computed Group family of standards to identify a TCB layer of the apparatus.

14. The apparatus of claim 13, wherein the attestation evidence indicates trustworthiness of the TCB layer.

15. The apparatus of claim 12, wherein the CA is a node within the group.

16. At least one non-transitory machine readable storage device comprising instructions stored thereupon, which when executed by processing circuitry of a computing device associated with a certificate authority (CA), cause the processing circuitry to:
- receive, from a requesting device, a request to join a group, the request including identification information for the group and attestation evidence;
- determine the group for the requesting device to join based on the identification information;
- identify the attestation evidence received from the requesting device, wherein the attestation evidence is generated by the requesting device but does not uniquely identify the requesting device; and
- responsive to receiving the request, verify whether the group includes at least a threshold number of members and, if the group includes at least the threshold number of members, create a group certificate for the group, and provide the group certificate for the group to the requesting device, wherein the computing device refrains from providing the group certificate if the group does not include at least the threshold number of members.

17. The non-transitory machine readable storage device of claim 16, wherein the identification information conforms to the Enhanced Privacy ID (EPID) family of standards and comprises a Trusted Computing Base (TCB) Component Identifier (TCI).

18. The non-transitory machine readable storage device of claim 17, wherein the processing circuitry is further caused to perform a hash operation based on the TCI to determine the group for the requesting device to join.

19. The non-transitory machine readable storage device of claim 17, wherein the processing circuitry is further caused to use the attestation evidence to select attestation evidence for inclusion in the group certificate.

20. The non-transitory machine readable storage device of claim 19, wherein the attestation evidence is location-based.

21. At least one non-transitory machine readable storage device comprising instructions stored thereupon, which when executed by processing circuitry of a node to operate in an edge computing network, cause the processing circuitry to:
- configure a layer identifier to identify a layer of the node;
- transmit a request to a certificate authority (CA) to join a group based on the layer identifier, the request including the layer identifier and attestation evidence, wherein the attestation evidence is generated by the node but does not uniquely identify the node; and
- receive, responsive to the request, a group certificate for the group identified by the layer identifier, wherein the CA operates to create the group certificate based on the attestation evidence and provide the group certificate to a plurality of requesting devices that includes the node, and wherein the CA uses the attestation evidence received from each respective device to select attestation evidence for inclusion in the group certificate.

22. The non-transitory machine readable storage device of claim 21, wherein the layer identifier is a Trusted Computing Base (TCB) Component Identifier (TCI) in accordance with a standard of the Trusted Computed Group family of standards to identify a TCB layer of the node, and, wherein the request further includes attestation evidence that indicates trustworthiness of the TCB layer.

23. The non-transitory machine readable storage device of claim 20, wherein the processing circuitry is further caused to apply a geographic-based policy based on the attestation evidence that is location-based.

24. The non-transitory machine readable storage device of claim 21, wherein the attestation evidence is location-based.

* * * * *